United States Patent
Tobe et al.

(10) Patent No.: US 11,787,898 B2
(45) Date of Patent: Oct. 17, 2023

(54) EPOXY RESIN, EPOXY RESIN-CONTAINING COMPOSITION AND CURED PRODUCT THEREOF

(71) Applicant: Mitsubishi Chemical Corporation, Chiyoda-ku (JP)

(72) Inventors: Akifumi Tobe, Tokyo (JP); Kou Miyama, Tokyo (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/690,216

(22) Filed: Nov. 21, 2019

(65) Prior Publication Data

US 2020/0087442 A1 Mar. 19, 2020

Related U.S. Application Data

(63) Continuation of application No. PCT/JP2018/019908, filed on May 23, 2018.

(30) Foreign Application Priority Data

May 25, 2017 (JP) .................... 2017-103732
Nov. 8, 2017 (JP) .................... 2017-215656

(51) Int. Cl.
*C08G 59/18* (2006.01)
*C08G 59/24* (2006.01)
*C08G 59/50* (2006.01)
*C08J 5/04* (2006.01)
*C09D 163/00* (2006.01)
*C09J 163/00* (2006.01)

(52) U.S. Cl.
CPC ......... *C08G 59/186* (2013.01); *C08G 59/245* (2013.01); *C08G 59/5033* (2013.01); *C08J 5/04* (2013.01); *C09D 163/00* (2013.01); *C09J 163/00* (2013.01); *C08J 2363/02* (2013.01)

(58) Field of Classification Search
CPC ............... C08G 59/186; C08G 59/245; C08G 59/5033; C08J 5/04; C08J 2363/02; C09D 163/00; C09J 163/00
USPC ...................................................... 525/533
See application file for complete search history.

(56) References Cited

U.S. PATENT DOCUMENTS

| | | |
|---|---|---|
| 3,979,477 A | 9/1976 | Schmid et al. |
| 5,132,374 A | 7/1992 | Reischmann et al. |
| 2016/0289376 A1 | 10/2016 | Zupancic et al. |

FOREIGN PATENT DOCUMENTS

| | | | |
|---|---|---|---|
| CN | 105683239 A | 6/2016 | |
| EP | 3 071 621 A1 | 9/2016 | |
| JP | 50-55700 A | 5/1975 | |
| JP | 50-84637 A | 7/1975 | |
| JP | 50-95400 A | 7/1975 | |
| JP | 54-21498 A | 2/1979 | |
| JP | 58-180521 A | 10/1983 | |
| JP | 60-141768 | 7/1985 | |
| JP | 64-90179 A | 4/1989 | |
| JP | 6-287475 A | 10/1994 | |
| JP | 7-309929 A | 11/1995 | |
| JP | 2013-108011 A | 6/2013 | |
| JP | 2015-63595 A | 4/2015 | |
| JP | 2016-222777 A | 12/2016 | |
| JP | 2016-537458 A | 12/2016 | |
| JP | 2017-8155 A | 1/2017 | |
| WO | WO-0001779 A1 * | 1/2000 | ............. C08G 59/12 |
| WO | WO 2015/073965 A1 | 5/2015 | |

OTHER PUBLICATIONS

Nagai et al., JP 60-141768 A machine translation in English used for citation, Jul. 26, 1985. (Year: 1985).*
Hexion, "EPIKOTE Resin 1001-X-75", Apr. 2014. (Year: 2014).*
Hexion, "EPON Resin 1004F", Sep. 2007. (Year: 2007).*
Hexion, "EPON Resin 1007F", Sep. 2007. (Year: 2007).*
Westlake, "EPON Resin 1009F", May 24, 2022. (Year: 2022).*
Huntsman Advanced Materials, "Strengthen your system, Resins Selector guide", 2012. (Year: 2012).*
International Search Report dated Jul. 17, 2018 in PCT/JP2018/019908 filed May 23, 2018 (with English translation).
Written Opinion dated Jul. 17, 2018 in PCT/JP2018/019908 filed May 23, 2018.
Extended European Search Report dated Apr. 1, 2020 in corresponding European Patent Application No. 18806616.1, 6 pages.
Combined Taiwanese Office Action and Search Report dated May 27, 2021 in Taiwanese Patent Application No. 107117964 A (with English translation), 10 pages.
Office Action dated Aug. 31, 2021, in the corresponding Japanese patent application No. 2018-077395 w/English machine translation.
Office Action dated Dec. 2, 2021 in the corresponding Chinese patent application No. 201880034099.3 and its English machine translation.

(Continued)

*Primary Examiner* — David T Karst
(74) *Attorney, Agent, or Firm* — Oblon, McClelland, Maier & Neustadt, L.L.P.

(57) ABSTRACT

An object of the present invention is to provide an epoxy resin, an epoxy resin-containing composition, and a cured product which are excellent in flexibility. The present invention relates to an epoxy resin, which is a reaction product of an epoxy compound (A) and an acid-terminated polyester (B). In addition, the present invention relates to an epoxy resin-containing composition and a cured product obtained by using the epoxy resin.

14 Claims, No Drawings

(56) References Cited

OTHER PUBLICATIONS

JP Information Offer issued in Japanese Patent Application No. 2018-077395 dated Jun. 21, 2022 (with English language translation).
Office Action dated Jul. 5, 2022, in corresponding Japanese Patent Application No. 2018-077395 (with English-language Translation).

* cited by examiner

EPOXY RESIN, EPOXY RESIN-CONTAINING COMPOSITION AND CURED PRODUCT THEREOF

TECHNICAL FIELD

The present invention relates to an epoxy resin. In addition, the present invention relates to an epoxy resin-containing composition and a cured product obtained by using the epoxy resin.

BACKGROUND ART

Epoxy resins are widely used in the fields of paint, civil engineering, an adhesive, electrical material, etc., in view of their excellent heat resistance, adhesiveness, and electrical properties. In these fields, flexibility is an important characteristic in satisfying required characteristics such as a sealing performance, construction surface followability, flex resistance, and a flexible property.

As the epoxy resin, for example, Patent Literature 1 proposes an epoxy resin having improved adhesiveness and chemical resistance, into which a polyalkylene glycol skeleton is introduced.

CITATION LIST

Patent Literature

Patent Literature 1: JP-A-2013-108011

SUMMARY OF INVENTION

Technical Problem

As described in Patent Literature 1, it is expected that the flexibility is also improved by introducing a highly flexible skeleton such as polyalkylene glycol into the epoxy resin. However, the epoxy resin in Patent Literature 1 cannot provide sufficient flexibility.

The present invention has been made in view of the above problem in the related art.

Namely, an object of the present invention is to provide an epoxy resin, an epoxy resin-containing composition, and a cured product which are excellent in flexibility.

Solution to Problem

The inventors of the present invention have made intensive studies in order to solve the above problem. As a result, it has been found that an epoxy resin having a polyester structure can solve the above problem. Thus, the present invention has been completed. Namely, the gist of the present invention is in the following [1] to [7].

[1] An epoxy resin, which is a reaction product of an epoxy compound (A) and an acid-terminated polyester (B).

[2] The epoxy resin according to [1], wherein a weight average molecular weight thereof is 7,000 to 300,000, and the weight average molecular weight/a number average molecular weight is 1.1 to 20.0.

[3] The epoxy resin according to [1] or [2], wherein the acid-terminated polyester (B) has a weight average molecular weight of 500 to 10,000, and the acid-terminated polyester (B) has the weight average molecular weight/a number average molecular weight of 1.1 to 10.0.

[4] An epoxy resin-containing composition, containing the epoxy resin according to any one of [1] to [3] and a curing agent.

[5] The epoxy resin-containing composition according to [4], wherein the curing agent is contained in an amount of from 0.1 to 1000 parts by weight based on 100 parts by weight of the epoxy resin.

[6] The epoxy resin-containing composition according to [4] or [5], wherein the curing agent is at least one selected from the group consisting of a polyfunctional phenol, a polyisocyanate compound, an amine compound, an acid anhydride compound, an imidazole compound, an amide compound, a mercaptan compound, a cationic polymerization initiator, an organic phosphine, a phosphonium salt and a tetraphenylboron salt.

[7] A cured product obtained by curing the epoxy resin-containing composition according to any one of [4] to [6].

Effects of Invention

According to the present invention, an epoxy resin, an epoxy resin-containing composition, and a cured product which are excellent in flexibility are provided.

Because of having the above characteristics, the epoxy resin, the epoxy resin-containing composition and the cured product of the present invention can be applied and developed in the fields of electric and electronic material, a FRP (fiber reinforced resin), an adhesive, paint, or the like.

DESCRIPTION OF EMBODIMENTS

Hereinafter, although embodiments of the present invention will be described in detail, the present invention is not limited to the following descriptions, and can be arbitrarily modified and implemented without departing from the gist of the present invention. In this description, when "to" is used to express numerical values or physical property values on two sides thereof, the values on the two sides thereof are included.

[Epoxy Resin]

The epoxy resin of the present invention is a reaction product obtained by reacting an epoxy compound (A) (hereinafter, referred to as "the epoxy compound (A) of the present invention") with an acid-terminated polyester (B) (hereinafter, referred to as "the acid-terminated polyester (B) of the present invention").

The epoxy resin of the present invention has an effect of being excellent in flexibility. This is presumably because the epoxy resin of the present invention has an ester bond in the molecule and thus has high adhesiveness to a base material, and as a result, the flexibility is improved. In addition, as to be described later, the epoxy resin of the present invention has further improved flexibility by reducing low molecular components that reduce the flexibility by narrowing a molecular weight distribution.

[Epoxy Compound (A)]

The epoxy compound (A) of the present invention is a compound having two or more epoxy groups in the molecule. Examples of the compound include a bifunctional epoxy compound having two epoxy groups and a trifunctional or higher functional epoxy compound having three or more epoxy groups.

Examples of the bifunctional epoxy compound having two epoxy groups include: bisphenol diglycidyl ethers such as bisphenol A diglycidyl ether, bisphenol F diglycidyl ether, bisphenol E diglycidyl ether, bisphenol Z diglycidyl ether, bisphenol S diglycidyl ether, bisphenol AD diglycidyl ether, bisphenol acetophenone diglycidyl ether, bisphenol trimethylcyclohexane diglycidyl ether, bisphenol fluorene glycidyl ether, tetramethylbisphenol A diglycidyl ether, tetramethylbisphenol F diglycidyl ether, tetra-t-butylbisphenol A diglycidyl ether, and tetramethylbisphenol S diglycidyl ether; biphenol diglycidyl ethers such as biphenol diglycidyl ether, tetramethyl biphenol diglycidyl ether, dimethyl biphenol diglycidyl ether, and tetra-t-butyl biphenol diglycidyl ether; benzenediol diglycidyl ethers such as hydroquinone diglycidyl ether, dihydroanthracene diglycidyl ether, methyl hydroquinone diglycidyl ether, dibutyl hydroquinone diglycidyl ether, resorcin diglycidyl ether, and methyl resorcin diglycidyl ether; aromatic diglycidyl ethers such as dihydroanthrahydroquinone diglycidyl ether, dihydroxydiphenyl ether diglycidyl ether, thiodiphenol diglycidyl ether, and dihydroxy naphthalene diglycidyl ether; epoxy compounds obtained by adding hydrogen to an aromatic ring of diglycidyl ether selected from the bisphenol diglycidyl ethers, the biphenol diglycidyl ethers, the benzenediol diglycidyl ethers and the aromatic diglycidyl ethers; epoxy resins produced from various carboxylic acids, such as an adipic acid, a succinic acid, a phthalic acid, a tetrahydrophthalic acid, a methyl hexahydrophthalic acid, a terephthalic acid, an isophthalic acid, an orthophthalic acid, a biphenyl dicarboxylic acid, and a dimer acid, and epihalohydrin; (poly) alkylene glycol diglycidyl ethers consisting only of a chain structure such as ethylene glycol diglycidyl ether, polyethylene glycol diglycidyl ether, propylene glycol diglycidyl ether, polypropylene glycol diglycidyl ether, 1,4-butanediol diglycidyl ether, polytetramethylene glycol diglycidyl ether, 1,5-pentanediol diglycidyl ether, polypentamethylene glycol diglycidyl ether, 1,6-hexanediol diglycidyl ether, polyhexamethylene glycol diglycidyl ether, 1,7-heptanediol diglycidyl ether, polyheptamethylene glycol diglycidyl ether, 1,8-octanediol diglycidyl ether, 1,10-decanediol diglycidyl ether, and 2,2-dimethyl-1,3-propanediol diglycidyl ether; and alkylene glycol diglycidyl ethers having a cyclic structure such as 1,4-cyclohexanedimethanol diglycidyl ether.

Examples of the trifunctional or higher functional epoxy compound having three or more epoxy groups include the following. In the following examples, " . . . epoxy resin" refers to an epoxy resin in which a hydroxyl group is substituted with a glycidyl ether group. That is, for example, "4,4',4"-trihydroxytriphenylmethane epoxy resin" refers to an epoxy resin in which the hydroxyl group of "4,4',4"-trihydroxytriphenylmethane" is substituted with a glycidyl ether group.

Examples include: trifunctional epoxy resins such as an α,α-bis(4-hydroxyphenyl)-4-(4-hydroxy-α,α-dimethylbenzyl)-ethylbenzene epoxy resin, a 4,4',4"-trihydroxytriphenylmethane epoxy resin, a 4,4',4"-ethyridinetris(2-methylphenol) epoxy resin, a 4,4'-(2-hydroxybenzylidene) bis(2,3,6-trimethylphenol) epoxy resin, a 2,3,4-trihydroxydiphenylmethane epoxy resin, a 2,4,6-tris(4,hydroxyphenyl)-1,3,5-triazine epoxy resin, a 1,3,5-tris(4-hydroxyphenyl)benzene epoxy resin, a 1,1,1-tris(4-hydroxyphenyl)ethane epoxy resin, a 4,4'-(1-{4-[1-(4-hydroxy-3,5-dimethylphenyl)-1-methylethyl]phenyl}ethylidene) bis(2-methylphenol) epoxy resin, and a 2,6-bis(4-hydroxy-3,5-dimethylbenzyl)-4-methylphenol epoxy resin; tetrafunctional epoxy resins such as a 2,2'-methylenebis[6-(2-hydroxy-5-methylbenzyl)-p-cresol epoxy resin, a 4-[bis(4-hydroxy-3-methylphenyl)methyl] benzene-1,2-diol epoxy resin, a 1,1,2,2-tetrakis(p-hydroxyphenyl)ethane epoxy resin, and an α,α,α',α',-tetrakis(4-hydroxyphenyl)-p-xylene epoxy resin; pentafunctional epoxy resins such as a 2,4,6-tris[(4-hydroxyphenyl)methyl]-1,3-benzenediol epoxy resin; epoxy compounds produced from various amine compounds, such as diaminodiphenylmethane, aminophenol and xylenediamine, and epihalohydrin; epoxy compounds produced from an aliphatic polyol and epihalohydrin; and multifunctional epoxy resins such as a phenol novolac epoxy resin, a cresol novolac epoxy resin, a bisphenol A novolac epoxy resin, a naphthol novolac epoxy resin, a phenol aralkyl epoxy resin, a biphenyl aralkyl epoxy resin and a phenol-modified xylene epoxy resin, or epoxy resins obtained by using various phenol-based compounds such as polyvalent phenol resins obtained by condensation reaction of various phenols with various aldehydes such as hydroxybenzaldehyde, crotonaldehyde and glyoxal, and copolycondensation resins of heavy oil or pitch, phenols and formaldehydes.

Among these, it is preferred to use a bifunctional epoxy compound from the viewpoint of preventing gelation during the production of the epoxy resin of the present invention. In addition, from the viewpoint of obtaining good flexibility, it is preferred to use bisphenol diglycidyl ethers, biphenol diglycidyl ethers, (poly)alkylene glycol diglycidyl ethers, an epoxy compound wherein hydrogen is added to an aromatic ring of bisphenol diglycidyl ethers, or an epoxy compound wherein hydrogen is added to an aromatic ring of biphenol diglycidyl ethers. Among these, it is more preferred to use (poly)alkylene glycol diglycidyl ethers, an epoxy compound wherein hydrogen is added to an aromatic ring of bisphenol diglycidyl ethers, or an epoxy compound wherein hydrogen is added to an aromatic ring of biphenol diglycidyl ethers.

The epoxy compound (A) mentioned above can be used alone or in combination of two or more thereof. Preferred combinations include a combination selected from bisphenol diglycidyl ethers, biphenol diglycidyl ethers, (poly) alkylene glycol diglycidyl ethers an epoxy compound wherein hydrogen is added to an aromatic ring of bisphenol diglycidyl ethers, and an epoxy compound wherein hydrogen is added to an aromatic ring of biphenol diglycidyl ethers.

[Acid-Terminated Polyester (B)]

The acid-terminated polyester (B) of the present invention is a compound having two or more carboxyl groups in the molecule.

The acid-terminated polyester (B) of the present invention is produced by polycondensation of a polycarboxylic acid and a polyhydric alcohol.

The polycarboxylic acid is not particularly limited, and examples thereof include the following divalent carboxylic acids and trivalent or higher carboxylic acids.

Examples of the divalent carboxylic acid include: aliphatic dicarboxylic acids such as isomers (specifically, 1,4-, 1,5-, 1,6-, 1,7-, 2,5-, 2,6-, 2,7-, 2,8-) of a terephthalic acid, an isophthalic acid and a naphthalene icarboxylic acid, a succinic acid, a sebacic acid, an isodecyl succinic acid, a dodecenyl succinic acid, a maleic acid, an adipic acid, a furandicarboxylic acid, a malonic acid, a glutaric acid, a pimelic acid, a suberic acid, an azelaic acid, a undecanedioic acid, a dodecanedioic acid, a brassic acid, a tetradecanedioic acid, a pentadecanedioic acid, a thapsinic acid, a heptadecanedioic acid, a dipropylmalonic acid, a 3-ethyl-3-methylglutaric acid, a 3,3-tetramethyleneglutaric acid, a dimer acid, and a hydrogenated dimer acid; a 1,1-cyclopropanedicarboxylic acid, a 1,2-cyclopropanedicarboxylic acid, a 1,1-cyclobutanedicarboxylic acid, a 1,2-cyclobutanedicarboxylic acid, a 1,2-cyclopentanedicarboxylic acid, a 1,3-cyclopentanedicarboxylic acid, a 1,2- cyclohexanedicarboxylic acid, a 1,3-cyclohexanedicarboxylic acid, a 1,4-cyclohexanedicarboxylic acid, a decahydro-1,4-naphthalenedicarboxylic acid, a 2,3-norbornane dicarboxylic acid, and a 1,3-adamantane dicarboxylic acid.

Examples of the trivalent or higher carboxylic acids include a trimellitic acid, a pyromellitic acid, a 1,2,4-cyclohexanetricarboxylic acid, a 2,5,7-naphthalene tricarboxylic acid, a 1,2,4-naphthalene tricarboxylic acid, a 1,2,5-hexanetricarboxylic acid, and a 1,2,7,8-octanetetracarboxylic acid.

These polycarboxylic acids may be used alone or in combination.

As the polycarboxylic acid, it is preferred to use a divalent carboxylic acid from the viewpoint of improving flexibility.

The polyhydric alcohol is not particularly limited, and examples thereof include the following dihydric alcohols and trihydric or higher alcohols.

Examples of the dihydric alcohol include: diols consisting only of a chain structure such as ethylene glycol, polyethylene glycol, propylene glycol, polypropylene glycol, 1,4-butanediol, polytetramethylene glycol, 1,5-pentanediol, polypentamethylene glycol, 1,6-hexanediol, polyhexamethylene glycol, 1,7-heptanediol, polyheptamethylene glycol, 1,8-octanediol, 1,10-decanediol, and 2,2-dimethyl-1,3-propanediol; and diols having a cyclic structure such as 1,4-cyclohexanedimethanol and isosorbide.

Examples of the trihydric or higher alcohol include trimethylolpropane, pentaerythritol, xylitol, sucrose, and glucose.

These polyhydric alcohols may be used alone or in combination.

As the polyhydric alcohol, a dihydric alcohol is preferably used from the viewpoint of improving flexibility, and a diol having a cyclic structure such as 1,4-cyclohexanedimethanol and isosorbide are particularly preferably used.

An amount of the diol having a cyclic structure used is not particularly limited, and in all components of the polyhydric alcohol, 10 mol % or more is preferred, 20 mol % or more is more preferred, and 30 mol % or more is particularly preferred, from the viewpoint of improving flexibility. In addition, in all components of the polyhydric alcohol, 90 mol % or less is preferred, 80 mol % or less is more preferred, and 70 mol % or less is particularly preferred, from the viewpoint of ensuring solvent solubility of the epoxy resin.

A combination of the polycarboxylic acid and the polyhydric alcohol is not particularly limited, and a combination selected from a divalent carboxylic acid and a dihydric alcohol is preferred from the viewpoint of improving flexibility.

A method for producing the acid-terminated polyester (B) of the present invention is not particularly limited, and the acid-terminated polyester (B) can be produced by a known method. For example, a monomer mixture containing a polycarboxylic acid component, a polyhydric alcohol component, etc. is charged into a reaction vessel, the temperature is raised, an esterification reaction or a transesterification reaction is performed in the presence of a catalyst, and the water or polyhydric alcohol component produced in the reaction is removed. Thereafter, a polycondensation reaction is performed. At this time, the pressure in the reaction vessel is gradually reduced, and polycondensation is performed with distilling off and removing the polyhydric alcohol component under a vacuum of 150 mmHg (20 kPa) or less, and preferably 15 mmHg (2 kPa) or less.

Examples of the catalyst for use in the esterification, transesterification, and polycondensation reactions include a titanium-based catalyst, calcium acetate, a calcium acetate hydrate, a tin-based catalyst such as dibutyltin oxide, tin acetate, tin disulfide, tin oxide and tin 2-ethylhexane, zinc acetate, antimony trioxide, and germanium dioxide. Among these, as the catalyst, a titanium-based catalyst is preferred from the viewpoint of obtaining good reactivity.

Examples of the titanium-based catalyst include a titanium alkoxide compound having an alkoxy group, a titanium carboxylate compound, a titanyl carboxylate, a titanyl carboxylate salt, and a titanium chelate compound.

Examples of the titanium alkoxide compound having an alkoxy group include tetramethoxy titanium, tetraethoxy titanium, tetrapropoxy titanium, tetrabutoxy titanium, tetrapentoxy titanium, and tetraoctoxy titanium.

Examples of the titanium carboxylate compound include titanium formate, titanium acetate, titanium propionate, titanium octanoate, titanium oxalate, titanium succinate, titanium maleate, titanium adipate, titanium sebacate, titanium hexane tricarboxylate, titanium isooctane tricarboxylate, titanium octane tetracarboxylate, titanium decane tetracarboxylate, titanium benzoate, titanium phthalate, titanium terephthalate, titanium isophthalate, titanium 1,3-naphthalenedicarboxylate, titanium 4,4-biphenyldicarboxylate, titanium 2,5-toluene dicarboxylate, titanium anthracene dicarboxylate, titanium trimellitate, titanium 2,4,6-naphthalene tricarboxylate, titanium pyromellitate, and titanium 2,3,4,6-naphthalene tetracarboxylate.

Among these titanium-based catalysts, tetrabutoxy titanium is preferred.

The titanium-based catalysts may be used alone or in combination of two or more thereof.

An amount of the catalyst used is preferably 50 ppm to 10,000 ppm based on the total weight of the polycarboxylic acid component and the polyhydric alcohol component from the viewpoint of ensuring polymerization reactivity. When the amount of the catalyst used is less than 50 ppm or more than 10,000 ppm, the polymerization reactivity decreases.

A reaction temperature of the esterification reaction, transesterification reaction or polycondensation reaction is preferably 150° C. to 300° C. When the reaction temperature is 150° C. or higher, the productivity of the obtained acid-terminated polyester (B) tends to be good, and when the reaction temperature is 300° C. or lower, decomposition of the obtained acid-terminated polyester (B) can be prevented. The lower limit of the reaction temperature is more preferably 180° C. or higher, and the upper limit thereof is more preferably 280° C. or lower.

A molecular weight of the acid-terminated polyester (B) of the present invention is not particularly limited, and a weight average molecular weight thereof is preferably 500 to 10,000. The weight average molecular weight (Mw) is preferably 500 or more, more preferably 750 or more, still more preferably 1,000 or more, particularly preferably 1,500 or more, and most preferably 2,000 or more, from the viewpoint of improving flexibility. In addition, the weight average molecular weight (Mw) is preferably 10,000 or less, more preferably 9,000 or less, and particularly preferably 8,000 or less, from the viewpoint of handling in synthesis.

A molecular weight distribution (=the weight average molecular weight (Mw)/a number average molecular weight (Mn)) of the acid-terminated polyester (B) of the present invention is preferably 1.1 to 10.0. The molecular weight distribution (Mw/Mn) is preferably 1.1 or more, more preferably 1.2 or more, still more preferably 1.3 or more, particularly preferably 1.5 or more, and most preferably 2.0 or more, from the viewpoint of raw material availability. In addition, the molecular weight distribution (Mw/Mn) is preferably 10.0 or less, more preferably 5.0 or less, and particularly preferably 4.3 or less from the view of improving flexibility.

The weight average molecular weight (Mw) and the number average molecular weight (Mn) of the acid-terminated polyester (B) can be measured by a gel permeation chromatography method (GPC method), and values in terms of polystyrene are used. A specific measurement method is as described in Examples below.

A glass transition temperature (Tg) of the acid-terminated polyester (B) is not particularly limited. Tg is preferably 0° C. or higher, more preferably 5° C. or higher, still more preferably 10° C. or higher, and particularly preferably 20° C. or higher, from the viewpoint of heat resistance. In addition, Tg is preferably 100° C. or lower, more preferably 95° C. or lower, still more preferably 90° C. or lower, and particularly preferably 80° C. or lower, from the viewpoint of handling in synthesis.

A hydroxyl value of the acid-terminated polyester (B) is not particularly limited. The hydroxyl value is preferably 0.001 mgKOH/g or more, more preferably 0.005 mgKOH/g or more, and particularly preferably 0.01 mgKOH/g or more, from the viewpoint of raw material availability. In addition, the hydroxyl value is preferably 60 mgKOH/g or less, more preferably 50 mgKOH/g or less, still more preferably 40 mgKOH/g or less, and particularly preferably 30 mgKOH/g or less, from the viewpoint of improving flexibility.

The acid value of the acid-terminated polyester (B) is not particularly limited. The acid value is preferably 10 mgKOH/g or more, more preferably 15 mgKOH/g or more, still more preferably 20 mgKOH/g or more, particularly preferably 25 mgKOH/g or more, and most preferably 30 mgKOH/g or more, from the viewpoint of handling in synthesis. In addition, the acid value is preferably 200 mgKOH/g or less, more preferably 175 mgKOH/g or less, still more preferably 150 mgKOH/g or less, particularly preferably 125 mgKOH/g or less, and most preferably 100 mgKOH/g or less, from the viewpoint of improving flexibility.

A specific method for measuring the glass transition temperature (Tg), the hydroxyl value, and the acid value of the acid-terminated polyester (B) are as described in Examples below.

Even when only 1 type of acid-terminal polyester (B) is used, a plurality of polycarboxylic acids and polyhydric alcohols having different types and physical properties can be used in combination.

[Polycarboxylic Acid (C)]

In the production of the epoxy resin of the present invention, in addition to the epoxy compound (A) and the acid-terminated polyester (B) as essential components, a polycarboxylic acid (C) (hereinafter referred to as "the polycarboxylic acid (C) of the present invention") may be used.

The polycarboxylic acid (C) of the present invention is a compound having two or more carboxyl groups in the molecule.

The polycarboxylic acid (C) may be an aromatic polycarboxylic acid, a heteroaromatic polycarboxylic acid, an aliphatic polycarboxylic acid, or an alicyclic polycarboxylic acid, and is not particularly limited. Examples thereof include the following divalent carboxylic acids, trivalent or higher carboxylic acids.

Examples of the divalent carboxylic acid include isomers (specifically, 1,4-, 1,5-, 1,6-, 1,7-, 2,5-, 2,6-, 2,7-, 2,8-) of a terephthalic acid, an isophthalic acid and a naphthalene dicarboxylic acid, a succinic acid, a sebacic acid, an isodecyl succinic acid, a dodecenyl succinic acid, a maleic acid, an adipic acid, a furandicarboxylic acid, a malonic acid, a glutaric acid, a pimelic acid, a suberic acid, an azelaic acid, a undecanedioic acid, a dodecanedioic acid, a brassic acid, a tetradecanedioic acid, a pentadecanedioic acid, a thapsinic acid, a heptadecanedioic acid, a dipropylmalonic acid, a 3-ethyl-3-methylglutaric acid, a 3,3-tetramethyleneglutaric acid, a dimer acid, and a hydrogenated dimer acid, a 1,1-cyclopropanedicarboxylic acid, a 1,2-cyclopropanedicarboxylic acid, a 1,1-cyclobutanedicarboxylic acid, a 1,2-cyclobutanedicarboxylic acid, a 1,2-cyclopentanedicarboxylic acid, a 1,3-cyclopentanedicarboxylic acid, a 1,2-cyclohexanedicarboxylic acid, a 1,3-cyclohexanedicarboxylic acid, a 1,4-cyclohexanedicarboxylic acid, a decahydro-1,4-naphthalenedicarboxylic acid, a 2,3-norbornane dicarboxylic acid, and a 1,3-adamantane dicarboxylic acid.

Examples of the trivalent or higher carboxylic acids include a trimellitic acid, a pyromellitic acid, a 1,2,4-cyclohexanetricarboxylic acid, a 2,5,7-naphthalene tricarboxylic acid, a 1,2,4-naphthalene tricarboxylic acid, a 1,2,5-hexanetricarboxylic acid, and a 1,2,7,8-octanetetracarboxylic acid.

These polycarboxylic acids (C) may be used alone or in combination.

As the polycarboxylic acid (C), it is preferred to use a divalent carboxylic acid from the viewpoint of improving flexibility. In addition, as the polycarboxylic acid (C), it is preferred to use an aliphatic polycarboxylic acid, an alicyclic polycarboxylic acid, or a dimer acid, and it is particularly preferred to use an alicyclic polycarboxylic acid or a dimer acid from the viewpoint of flexibility.

[Phenol-Based Compound (D)]

In the production of the epoxy resin of the present invention, in addition to the epoxy compound (A) and the acid-terminated polyester (B) as essential components, a phenol-based compound (D) (hereinafter referred to as "the phenol-based compound (D) of the present invention") may be used.

The phenol-based compound (D) of the present invention is a compound having two or more hydroxyl groups bonded to an aromatic ring. By copolymerizing the phenol-based compound (D) together with the epoxy compound (A) and the acid-terminated polyester (B), it is advantageous in adjusting a viscosity of the production process and controlling physical properties of the obtained epoxy resin.

Examples of the phenol-based compound (D) of the present invention include a bifunctional phenol-based compound having two hydroxyl groups bonded to an aromatic ring, and a trifunctional or higher functional phenol-based compound having three or more hydroxyl groups bonded to an aromatic ring.

Examples of the bifunctional phenol-based compound having two hydroxyl groups bonded to an aromatic ring include: bisphenols such as bisphenol A, bisphenol F, bisphenol E, bisphenol Z, bisphenol S, bisphenol AD, bisphenol acetophenone, bisphenol trimethylcyclohexane, bisphenol fluorene, tetramethylbisphenol A, tetramethylbisphenol F, tetra-t-butylbisphenol A, and tetramethylbisphenol S; biphenols such as biphenol, tetramethylbiphenol, dimethylbiphenol, and tetra-t-butylbiphenol; benzenediols such as hydroquinone, methylhydroquinone, dibutylhydroquinone, resorcin, and methylresorcin (here, "benzenediols" are compounds having one benzene ring, in which two hydroxyl groups are directly bonded to the benzene ring); dihydroanthrahydroquinones such as dihydroanthrahydroquinone; dihydroxy diphenyl ethers such as dihydroxy diphenyl ether; thiodiphenols such as thiodiphenol; dihydroxynaphthalenes such as dihydroxynaphthalene; and dihydroxystilbenes such as dihydroxystilbene.

Examples of the trifunctional or higher trifunctional phenol-based compound having three or more hydroxyl groups bonded to an aromatic ring include: trifunctional phenol-based compounds such as α,α-bis(4-hydroxyphenyl)-4-(4-hydroxy-α,α-dimethylbenzyl)-ethylbenzene, 4,4',4"-trihydroxytriphenylmethane, 4,4',4"-ethyridine tris(2-methylphenol), 4,4'-(2-hydroxybenzylidene) bis(2,3,6-trimethylphenol), 2,3,4-trihydroxydiphenylmethane, 2,4,6-tris(4-hydroxyphenyl)-1,3,5-triazine, 1,3,5-tris(4-hydroxyphenyl)benzene, 1,1,1-tris(4-hydroxyphenyl)ethane, 4,4'-(1-{4-[1-(4-hydroxy-3,5-dimethylphenyl)-1-methylethyl]phenyl}ethylidene)bis(2-methylphenol), 2,6-bis(4-hydroxy-3,5-dimethylbenzyl)-4-methylphenol; tetrafunctional phenol-based compounds such as 2,2'-methylenebis[6-(2-hydroxy-5-methylbenzyl)-p-cresol], 4-[bis(4-hydroxy-3-methylphenyl)methyl]benzene-1,2-diol, 1,1,2,2-tetrakis(p-hydroxyphenyl)ethane, α,α,α',α'-tetrakis(4-hydroxyphenyl)-p-xylene, pentafunctional phenolic compounds such as 2,4,6-tris[(4-hydroxyphenyl)methyl]-1,3-benzenediol; various phenol resins such as phenol novolac resins, cresol novolac resins, bisphenol novolac resins such as a bisphenol A novolac resin, a naphthol novolac resin, a phenol aralkyl resin, a terpene phenol resin, a dicyclopentadiene phenol resin, a phenol biphenylene resin and a phenol modified xylene resin; polyvalent phenol resins obtained by condensation reaction of these various phenols with various aldehydes such as hydroxybenzaldehyde, crotonaldehyde and glyoxal; and multifunctional phenol based compounds such as copolycondensation resins of heavy oil or pitch, phenols and formaldehydes.

These phenol-based compounds (D) can be used alone or in combination.

Among these, from the viewpoint of preventing gelation during the production of the epoxy resin, it is preferred to use a bifunctional phenol-based compound having two hydroxyl groups bonded to an aromatic ring.

[Crosslinking Agent]

In the production of the epoxy resin of the present invention, a crosslinking agent which reacts with a secondary hydroxyl group in the epoxy resin of the present invention may be used. In the case of using the crosslinking agent, as the amount used, the amount of the functional group of the crosslinking agent which reacts with the secondary hydroxyl group is preferably in an amount of less than 0.01 equivalent, more preferably in an amount of 0.009 equivalent or less, and still more preferably in an amount of 0.005 equivalent or less relative to the epoxy group of the epoxy compound (A). It is particularly preferred that the crosslinking agent is not substantially contained from the viewpoint of ensuring the flexibility of the obtained epoxy resin. Depending on the amount of the crosslinking agent used, the epoxy resin of the present invention may be gelated, solvent solubility may deteriorate, and handling problems may occur when used in paints.

Examples of the crosslinking agent include a polyisocyanate-based compound and an acid anhydride compound.

Examples of the polyisocyanate-based compound include polyisocyanate compounds such as tolylene diisocyanate, methylcyclohexane diisocyanate, diphenylmethane diisocyanate, dicyclohexylmethane diisocyanate, isophorone diisocyanate, hexamethylene diisocyanate, xylylene diisocyanate, hydrogenated xylylene diisocyanate, dimer acid diisocyanate, trimethylhexamethylene diisocyanate, and lysine triisocyanate. Further examples include polyisocyanate compounds obtained by reacting these polyisocyanate compounds with compounds having at least two active hydrogen atoms in an amino group, a hydroxyl group, a carboxyl group, or water, or trimers to pentamers of the above polyisocyanate compounds.

Examples of the acid anhydride compound include a condensate of a phthalic anhydride, hexahydrophthalic anhydride, trimellitic anhydride, and maleic anhydride and an unsaturated compound.

Particularly, the polyisocyanate-based compound has high reactivity with the secondary hydroxyl group in the epoxy resin of the present invention. In the case of using the polyisocyanate-based compound, depending on the amount used, the epoxy resin of the present invention may be gelated, solvent solubility may deteriorate, and handling problems may occur when used in paints. Therefore, as the amount used, the amount of the isocyanate group which reacts with the secondary hydroxyl group in the epoxy resin of the present invention is preferably in an amount of less than 0.01 equivalent, more preferably in an amount of 0.009 equivalent or less, and still more preferably in an amount of 0.005 equivalent or less relative to the epoxy group of the epoxy compound (A). It is particularly preferred that the polyisocyanate-based compound is not substantially contained from the viewpoint of ensuring the flexibility of the obtained epoxy resin.

[Blending Ratio of Epoxy Compound (A), Acid-Terminated Polyester (B), Polycarboxylic Acid (C) and Phenol-Based Compound (D)]

The blending ratio of the epoxy compound (A) and acid-terminated polyester (B) used in the production of the epoxy resin of the present invention, of the polycarboxylic acid (C) and the phenol compound (D) used as necessary is preferably a blending ratio at which a theoretical epoxy equivalent of an obtained epoxy resin is 200,000 g/equivalent or less, more preferably a blending ratio at which the theoretical epoxy equivalent of the obtained epoxy resin is 150,000 g/equivalent or less, and particularly preferably a blending ratio at which the theoretical epoxy equivalent of the obtained epoxy resin is 100,000 g/equivalent or less from the viewpoint of ensuring compatibility with other materials. On the other hand, it is preferred that the lower limit of the theoretical epoxy equivalent is more than 100 g/equivalent, 120 g/equivalent or more, further 150 g/equivalent or more, particularly 200 g/equivalent or more, more particularly 500 g/equivalent or more, especially preferably 1,000 g/equivalent or more since an epoxy resin excellent in flexibility can be obtained.

Here, the theoretical epoxy equivalent refers to an epoxy equivalent of a reaction product when all epoxy groups contained in the epoxy compound (A), the acid-terminated polyester (B), the polycarboxylic acid (C), and the phenol-based compound (D) react with a phenolic hydroxyl group or carboxyl group at a ratio of 1:1.

In the present invention, the "epoxy equivalent" is defined as "a mass of an epoxy compound containing one equivalent of an epoxy group" and can be measured according to JIS K7236.

Specifically, the proportion of the epoxy compound (A) used is preferably from 1 to 90 parts by weight, more preferably from 5 to 70 parts by weight, and still more preferably from 10 to 50 parts by weight, based on total 100 parts by weight of the epoxy compound (A), the acid-terminated polyester (B), and the polycarboxylic acid (C) and the phenol compound (D) which are used as necessary.

In addition, the proportion of the acid-terminated polyester (B) used is preferably from 10 to 99 parts by weight, more preferably from 30 to 95 parts by weight, and still more preferably from 50 to 90 parts by weight, based on total 100 parts by weight of the epoxy compound (A), the acid-terminated polyester (B), and the polycarboxylic acid (C) and the phenol compound (D) which are used as necessary.

In the case of using the polycarboxylic acid (C) in the production of the epoxy resin of the present invention, from the viewpoint of preventing gelation during production, the proportion of the polycarboxylic acid (C) used is preferably 20 parts by weight or less, and particularly 10 parts by weight or less based on total 100 parts by weight of the epoxy compound (A), the acid-terminated polyester (B), and the polycarboxylic acid (C). In addition, from the viewpoint of improving flexibility, the proportion of the polycarboxylic acid (C) used is preferably 0.5 part by weight or more, and particularly 1 part by weight or more based on total 100 parts by weight of the epoxy compound (A), the acid-terminated polyester (B), and the polycarboxylic acid (C).

In addition, in the case of using the phenol-based compound (D) in the production of the epoxy resin of the present invention, from the viewpoint of improving flexibility, the proportion of the phenol compound (D) used is preferably 20 parts by weight or less, for example 1 to 19 parts by weight based on total 100 parts by weight of the epoxy compound (A), the acid-terminated polyester (B), and the polycarboxylic acid (C) and the phenol compound (D) which are used as necessary.

The presence of the above compound in the epoxy resin can be confirmed by SEC-MALS analysis, elemental analysis and functional group analysis.

[Method for Producing Epoxy Resin]

The epoxy resin of the present invention is produced by reacting the epoxy compound (A), the acid-terminated polyester (B), and the polycarboxylic acid (C) and/or the phenol-based compound (D) which are used as necessary under the preferred mixing ratio as described above.

<Catalyst (E)>

A catalyst (E) may be used in the reaction step for producing the epoxy resin of the present invention. The catalyst (E) is not particularly limited as long as it is usually used as a catalyst for the advance method in the method for producing an epoxy resin.

Examples of the catalyst (E) include alkali metal compounds, organic phosphorus compounds, tertiary amines, quaternary ammonium salts, cyclic amines, and imidazoles.

Specific examples of the alkali metal compound include: alkali metal hydroxides such as sodium hydroxide, lithium hydroxide and potassium hydroxide; alkali metal salts such as sodium carbonate, sodium bicarbonate, sodium chloride, lithium chloride, and potassium chloride; alkali metal alkoxides such as sodium methoxide and sodium ethoxide; alkali metal hydrides such as alkali metal phenoxide, sodium hydride, and lithium hydride; and alkali metal salts of organic acids such as sodium acetate and sodium stearate.

Specific examples of the organic phosphorus compound include triphenylphosphine, tri-o-tolylphosphine, tri-m-tolylphosphine, tri-p-tolylphosphine, tri-2,4-xylylphosphine, tri-2,5-xylylphosphine, tri-3,5-xylylphosphine, tris(p-tert-butylphenyl)phosphine, tris(p-methoxyphenyl)phosphine, tris(p-tert-butoxyphenyl) phosphine, tri(p-n-octylphenyl)phosphine, tri(p-n-nonylphenyl)phosphine, triallylphosphine, tributylphosphine, trimethylphosphine, tribenzylphosphine, triisobutylphosphine, tri-tert-butylphosphine, tri-n-octylphosphine, tricyclohexylphosphine, tri-n-propylphosphine, di-tert-butylmethylphosphine, tri-n-butylphosphine, cyclohexyldi-tert-butylphosphine, diethylphenylphosphine, di-n-butylphenylphosphine, di-tert-butylphenylphosphine, methyldiphenylphosphine, ethyldiphenylphosphine, diphenylpropylphosphine, isopropyldiphenylphosphine, cyclohexyldiphenylphosphine, tetramethylphosphonium bromide, tetramethylphosphonium iodide, tetramethylphosphonium hydroxide, trimethylcyclohexylphosphonium chloride, trimethylcyclohexylphosphonium bromide, trimethylbenzylphosphonium chloride, trimethylbenzylphosphonium bromide, tetraphenylphosphonium bromide, triphenylmethylphosphonium bromide, triphenylmethylphosphonium iodide, triphenylethylphosphonium chloride, triphenylethylphosphonium bromide, triphenylethylphosphonium iodide, triphenylbenzylphosphonium chloride, and triphenylbenzylphosphonium bromide.

Specific examples of the tertiary amines include triethylamine, tri-n-propylamine, tri-n-butylamine, triethanolamine, and N,N-dimethylbenzylamine.

Specific examples of the quaternary ammonium salt include tetramethylammonium chloride, tetramethylammonium bromide, tetramethylammonium hydroxide, tri ethylmethylammonium chloride, tetraethylammonium chloride, tetraethylammonium bromide, tetraethylammonium iodide, tetrapropylammonium bromide, tetrapropylammonium hydroxide, tetrabutylammonium chloride, tetrabutylammonium bromide, tetrabutylammonium iodide, benzyltrimethylammonium chloride, benzyltrimethylammonium bromide, benzyltrimethylammonium hydroxide, benzyltributylammonium chloride, and phenyltrimethylammonium chloride.

Specific examples of the cyclic amines include 1,8-diazabicyclo(5,4,0)-7-undecene, and 1,5-diazabicyclo(4,3,0)-5-nonene.

Specific examples of the imidazoles include 2-methylimidazole, 2-ethyl-4-methylimidazole, and 2-phenylimidazole.

The catalysts (E) mentioned above may be used alone or in combination of two or more thereof.

In the case of using the catalyst (E), the amount used is preferably 10,000 ppm by weight or less, for example, 10 to 5,000 ppm by weight, based on the amount of the epoxy compound (A) used.

<Reaction Solvent (F)>

A reaction solvent (F) may be used in the reaction step for producing the epoxy resin of the present invention. Any solvent can be used the reaction solvent (F) as long as it can dissolve the raw material, and it is usually an organic solvent.

Examples of the organic solvent include an aromatic solvent, a ketone solvent, an amide solvent, and a glycol ether solvent. Specific examples of the aromatic solvent include benzene, toluene, and xylene. Specific examples of the ketone solvent include acetone, methyl ethyl ketone, methyl isobutyl ketone, 2-heptanone, 4-heptanone, 2-octanone, cyclopentanone, cyclohexanone, and acetylacetone. Specific examples of the amide solvent include formamide, N-methylformamide, N,N-dimethylformamide, acetamide, N-methylacetamide, N,N-dimethylacetamide, 2-pyrrolidone, and N-methylpyrrolidone. Specific examples of the glycol ether solvent include ethylene glycol monomethyl ether, ethylene glycol monoethyl ether, ethylene glycol mono-n-butyl ether, ethylene glycol dimethyl ether, ethylene glycol monoethyl ether acetate, diethylene glycol monomethyl ether, diethylene glycol monoethyl ether, diethylene glycol mono-n-butyl ether, diethylene glycol dimethyl ether, diethylene glycol monoethyl ether acetate, propylene glycol monomethyl ether, propylene glycol mono-n-butyl ether, and propylene glycol monomethyl ether acetate.

The reaction solvents (F) mentioned above may be used alone or in combination of two or more thereof.

When a highly viscous product is produced during the reaction, the reaction can be continued by further adding the reaction solvent (F).

<Reaction Condition>

The reaction between the epoxy compound (A), the acid-terminated polyester (B), and the polycarboxylic acid (C) and/or the phenol-based compound (D) which are used as necessary can be performed under normal pressure, increased pressure, or reduced pressure.

The reaction temperature is usually from 60° C. to 240° C., preferably from 80° C. to 220° C., and more from preferably 100° C. to 200° C. It is preferred that the reaction temperature is equal to or higher than the lower limit since the reaction can easily proceed. In addition, it is preferred from the viewpoint of obtaining a high purity epoxy resin that the reaction temperature is equal to or lower than the upper limit since the side reaction is unlikely to proceed.

A reaction time is not particularly limited, and is usually from 0.5 hour to 24 hours, preferably from 1 hour to 22 hours, and more preferably from 1.5 hours to 20 hours. It is preferred from the viewpoint of improving production efficiency that the reaction time is equal to or shorter than the upper limit, and it is preferred from the viewpoint of reducing unreacted components that the reaction time is equal to or longer than the lower limit.

<Dilution Solvent (G)>

In the epoxy resin of the present invention, a solid content concentration may be adjusted by mixing a dilution solvent (G) after completion of the reaction. The dilution solvent (G) may be any solvent as long as it can dissolve the epoxy resin, and is usually an organic solvent. Specific examples of the organic solvent can be the same as those mentioned as the reaction solvent (F).

In the present invention, the terms "medium" and "solvent" are used as "medium" when used during the reaction, and as "solvent" when used after the completion of the reaction. The same or different types of them may be used.

[Epoxy Equivalent]

The epoxy equivalent of the epoxy resin of the present invention is preferably 200 g/equivalent or more, more preferably 250 g/equivalent or more, still more preferably 300 g/equivalent or more, even more preferably 500 g/equivalent or more, particularly preferably 1,000 g/equivalent or more, and especially preferably 1,500 g/equivalent or more. When the epoxy equivalent is equal to or larger than the lower limit, the flexibility can be improved.

In addition, the upper limit of the epoxy equivalent of the epoxy resin of the present invention is not particularly limited, and is preferably 200,000 g/equivalent or less, more preferably 100,000 g/equivalent or less, still more preferably 50,000 g/equivalent or less, particularly preferably 20,000 g/equivalent or less, and especially preferably 10,000 g/equivalent or less, from the viewpoint of compatibility with other materials.

[Weight Average Molecular Weight (Mw) and Molecular Weight Distribution]

A weight average molecular weight (Mw) of the epoxy resin of the present invention is preferably from 7,000 to 300,000. The weight average molecular weight (Mw) of the epoxy resin of the present invention is preferably 7,000 or more, more preferably 7,100 or more, still more preferably 7,200 or more, even more preferably 7,500 or more, particularly preferably 8,000 or more, especially preferably 9,000 or more, and most preferably 10,000 or more from the viewpoint of improving flexibility. In addition, the weight average molecular weight (Mw) of the epoxy resin of the present invention is preferably 300,000 or less, more preferably 200,000 or less, still more preferably 150,000 or less, particularly preferably 100,000 or less, and most preferably 50,000 or less from the viewpoint of compatibility with other materials.

A value of the molecular weight distribution (=weight average molecular weight (Mw)/a number average molecular weight (Mn)) of the epoxy resin of the present invention is preferably from 1.1 to 20.0. The value of the molecular weight distribution (Mw/Mn) of the epoxy resin of the present invention is preferably 1.1 or more, more preferably 1.2 or more, still more preferably 1.3 or more, particularly preferably 1.5 or more, and most preferably 2.0 or more from the viewpoint of synthesizing an epoxy resin having a desired weight average molecular weight. In addition, although the value of the molecular weight distribution (Mw/Mn) of the epoxy resin of the present invention is preferably 20.0 or less, sufficient flexibility may not be exhibited depending on the base material used. In this case, since low molecular components which reduce flexibility can be reduced by narrowing the molecular weight distribution, the value of the molecular weight distribution (Mw/Mn) of the epoxy resin of the present invention is more preferably 15.0 or less, and particularly preferably 10.0 or less from the viewpoint of improving flexibility.

The weight average molecular weight (Mw) and the number average molecular weight (Mn) of the epoxy resin can be measured by a gel permeation chromatography method (GPC method). An example of the more detailed method will be described in Examples described later.

[Glass Transition Temperature]

A glass transition temperature (Tg) of the epoxy resin of the present invention is preferably 0° C. or higher, more preferably 5° C. or higher, and still more preferably 10° C. or higher. When Tg is equal to or higher than the lower limit, it is preferred from the viewpoint of ensuring hardness and corrosion resistance when a coating film is formed.

In addition, the upper limit of the glass transition temperature (Tg) of the epoxy resin of the present invention is not particularly limited, and is preferably 150° C. or lower, more preferably 140° C. or lower, still more preferably 130° C. or lower, particularly preferably 120° C. or lower, especially preferably 110° C. or lower, and most preferably 100° C. or lower, from the viewpoint of ensuring flexibility.

The Tg of the epoxy resin can be measured using a differential scanning calorimeter. An example of the more detailed method will be described in Examples described later.

[Epoxy Resin-containing Composition]

The epoxy resin-containing composition of the present invention contains at least the above epoxy resin of the present invention and a curing agent. In addition, in the epoxy resin-containing composition of the present invention, other epoxy compounds, a curing accelerator, other components, or the like can be appropriately blended as necessary.

[Curing Agent]

A curing agent used in the epoxy resin-containing composition of the present invention is a substance which contributes to a crosslinking reaction and/or chain extension reaction between epoxy groups of the epoxy resin. In the present invention, usually, even what is called a "curing accelerator" is regarded as a curing agent if it is a substance which contributes to the crosslinking reaction and/or chain extension reaction between epoxy groups of the epoxy resin.

A content of the curing agent in the epoxy resin-containing composition of the present invention is preferably from 0.1 to 1000 parts by weight, more preferably 100 parts by weight or less, still more preferably 80 parts by weight or less, and particularly preferably 60 parts by weight or less, based on 100 parts by weight of the epoxy resin of the present invention.

In addition, in the epoxy resin-containing composition of the present invention, the content of the curing agent when other epoxy compounds to be described later other than the epoxy resin of the present invention are included is preferably from 0.1 to 1000 parts by weight, more preferably 100 parts by weight or less, still more preferably 80 parts by weight or less, and particularly preferably 60 parts by weight or less, based on 100 parts by weight of all epoxy components as solid contents.

More preferred amounts of the curing agent are as described below depending on the type of the curing agent.

In the present invention, the "solid content" refers to a component excluding a medium, and includes not only a solid epoxy resin or an epoxy compound but also a semi-solid or viscous liquid material. In addition, the "all epoxy components" refers to the sum of the epoxy resin of the present invention and other epoxy compounds to be described later.

In the epoxy resin-containing composition of the present invention, the curing agent preferably uses at least one of the group consisting of a polyfunctional phenol, a polyisocyanate compound, an amine compound, an acid anhydride compound, an imidazole compound, an amide compound, a cationic polymerization initiator, an organic phosphine, a phosphonium salt and a tetraphenylboron salt.

Examples of the polyfunctional phenol include: bisphenols such as bisphenol A, bisphenol F, bisphenol S, bisphenol B, bisphenol AD, bisphenol Z, and tetrabromobisphenol A; biphenols such as 4,4'-biphenol and 3,3',5,5'-tetramethyl-4,4'-biphenol; catechol, resorcin, hydroquinone, dihydroxynaphthalene; and those in which the hydrogen atom bonded to the aromatic ring of these compounds is substituted with a non-interfering substituent such as a halogen group, an alkyl group, an aryl group, an ether group, an ester group, and an organic substituent containing a hetero element such as sulfur, phosphorus, and silicon.

Further examples include novolaks and resols which are polycondensates of the phenols or monofunctional phenols such as phenols or phenol, cresol and alkylphenol with aldehydes.

Examples of the polyisocyanate-based compound include polyisocyanate compounds such as tolylene diisocyanate, methylcyclohexane diisocyanate, diphenylmethane diisocyanate, dicyclohexylmethane diisocyanate, isophorone diisocyanate, hexamethylene diisocyanate, xylylene diisocyanate, hydrogenated xylylene diisocyanate, dimer acid diisocyanate, trimethylhexamethylene diisocyanate, and lysine triisocyanate. Further examples include polyisocyanate compounds obtained by reacting these polyisocyanate compounds with compounds having at least two active hydrogen atoms in an amino group, a hydroxyl group, a carboxyl group or water, or trimers to pentamers of the above polyisocyanate compounds.

Examples of the amine compound include aliphatic primary, secondary and tertiary amines, aromatic primary, secondary and tertiary amines, cyclic amines, guanidines, and urea derivatives. Specific examples thereof include triethylenetetramine, diaminodiphenylmethane, diaminodiphenyl ether, metaxylenediamine, dicyandiamide, 1,8-diazabicyclo(5,4,0)-7-undecene, 1,5-diazabicyclo(4,3,0)-5-nonene, dimethylurea, and guanylurea.

Examples of the acid anhydride compound include phthalic anhydride, hexahydrophthalic anhydride, trimellitic anhydride, and a condensate of maleic anhydride and an unsaturated compound.

Examples of the imidazole compound include 1-isobutyl-2-methylimidazole, 2-methylimidazole, 1-benzyl-2-methylimidazole, 2-ethyl-4-methylimidazole, 2-phenylimidazole, and benzimidazole. The imidazole compound also functions as a curing accelerator to be described later, but in the present invention, it is classified as a curing agent.

Examples of the amide compound include dicyandiamide and derivatives thereof, and polyamide resins.

The cationic polymerization initiator generates cations by heat or active energy ray irradiation, and examples thereof include aromatic onium salts. Specific examples thereof include a compound containing an anion component such as $SbF_6^-$, $BF_4^-$, $AsF_6^-$, $PF_6^-$, $CF_3SO_{32}^-$, and $B(C_6F_5)_4^-$ and an aromatic cation component containing atoms such as iodine, sulfur, nitrogen and phosphorus. Particularly, diaryl iodonium salts and triaryl sulfonium salts are preferred.

Examples of the organic phosphine include tributylphosphine, methyldiphenylphosphine, triphenylphosphine, diphenylphosphine, and phenylphosphine. Examples of the phosphonium salt include tetraphenylphosphonium tetraphenylborate, tetraphenylphosphonium ethyltriphenylborate, and tetrabutylphosphonium tetrabutylborate. Examples of the tetraphenylboron salt include 2-ethyl-4-methylimidazole tetraphenylborate and N-methylmorpholine tetraphenylborate.

In the case of using the polyfunctional phenols, the amine compound or the acid anhydride compound as the curing agent, it is preferably used such that the number of functional groups (the number of hydroxyl groups in the polyfunctional phenols, the number of amino groups in the amine compound, or the number of acid anhydride groups in the acid anhydride compound) in the curing agent is in an equivalent ratio range of 1:0.8 to 1:1.5 based on the total number of epoxy groups in the epoxy resin-containing composition.

In the case of using the polyisocyanate-based compound as the curing agent, it is preferably used such that the number of isocyanate groups in the polyisocyanate-based compound is in an equivalent ratio range of 1:0.01 to 1:1.5 based on the number of hydroxyl groups in the epoxy resin-containing composition.

In the case of using the imidazole compound as the curing agent, it is preferably used in the range of 0.5 to 10 parts by weight based on 100 parts by weight of all epoxy components as solid contents in the epoxy resin-containing composition.

In the case of using the amide compound as the curing agent, it is preferably used in the range of 0.1 wt % to 20 wt % based on the total amount of all epoxy components as solid contents and the amide compound in the epoxy resin-containing composition.

In the case of using the cationic polymerization initiator as the curing agent, it is preferably used in the range of 0.01 to 15 parts by weight based on 100 parts by weight of all epoxy components as solid contents in the epoxy compound-containing composition.

In the case of using the organic phosphine, the phosphonium salt or the tetraphenylboron salt as the curing agent, it is preferably used in the range of 0.1 wt % to 20 wt % based on the total amount of all epoxy components as solid contents and the organic phosphine, the phosphonium salt or the tetraphenylboron salt in the epoxy resin-containing composition.

In addition to the curing agents mentioned above, for example, a mercaptan compound, am organic acid dihydrazide, a boron halide amine complex, or the like can be used as the curing agent in the epoxy resin-containing composition of the present invention.

These curing agents may be used alone or in combination of two or more thereof.

[Other Epoxy Compound]

An epoxy compound other than the epoxy resin of the present invention (in this description, referred to as "other epoxy compound") can be used in the epoxy resin-containing composition of the present invention.

Examples of the other epoxy compound include epoxy compounds such as glycidyl ether epoxy resins such as a bisphenol A epoxy resin, a bisphenol F epoxy resin, a bisphenol S epoxy resin, a biphenyl epoxy resin, a phenol novolac epoxy resin, a cresol novolac epoxy resin, a bisphenol A novolac epoxy resin, a tetrabromobisphenol A epoxy resin, and other polyfunctional phenol epoxy resins, an epoxy resin obtained by hydrogenating the aromatic ring of the aromatic epoxy resin, a glycidyl ester epoxy resin, a glycidyl amine epoxy resin, a linear aliphatic epoxy resin, an alicyclic epoxy resin, and a heterocyclic epoxy resin.

The other epoxy compounds mentioned above may be used alone or in combination of two or more thereof.

When the epoxy resin-containing composition of the present invention contains the epoxy resin of the present invention and the other epoxy compound, a proportion of other epoxy compound in all epoxy components as solid contents in the epoxy resin-containing composition is preferably 1 wt % or more, and more preferably 5 wt % or more, while is preferably 99 wt % or less, and more preferably 95 wt % or less. When the proportion of the other epoxy compound is equal to or larger than the lower limit, an effect of improving physical properties by blending the other epoxy compound can be sufficiently obtained. On the other hand, when the proportion of the other epoxy compound is equal to or lower than the upper limit, a flexibility improving effect by the epoxy resin of the present invention can be obtained.

[Solvent]

The epoxy resin-containing composition of the present invention may be diluted by blending a solvent in order to appropriately adjust the viscosity of the epoxy resin-containing composition during handling such as coating film formation. In the epoxy resin-containing composition of the present invention, the solvent is used to ensure the handleability and workability in shaping the epoxy resin-containing composition, and the amount to be used is not particularly limited. As described above, in the present invention, the term "solvent" and the term "medium" are distinguished from each other depending on the form of use. The same or different types of them may be independently used.

As a solvent which can be contained in the epoxy resin containing composition of the present invention, one type or two or more types of the organic solvents mentioned as the reaction solvent (F) for use in the production of the epoxy resin of the present invention can be used.

[Other Component]

The epoxy resin-containing composition of the present invention can contain other components in addition to the components mentioned above. Examples of the other component include a curing accelerator (however, those corresponding to the curing agent are excluded), a coupling agent, a flame retardant, an antioxidant, a light stabilizer, a plasticizer, a reactive diluent, a pigment, an inorganic filler, and an organic filler. The other components mentioned above can be used in appropriate combination depending on the desired physical properties of the epoxy resin-containing composition.

The blending of the above compounds in the epoxy resin-containing composition of the present invention can be confirmed by an SEC-MALS method, elemental analysis method, and functional group analysis after separation and purification of the epoxy resin-containing composition.

[Cured Product]

The cured product of the present invention can be obtained by curing the epoxy resin-containing composition of the present invention. Here, "curing" means that the epoxy resin is intentionally cured by heat and/or light, and the degree of curing may be controlled by the desired physical properties and applications.

The method for curing the epoxy resin-containing composition when curing the epoxy resin-containing composition of the present invention is cured to obtain a cured product is different depending on the blending components, the blending amount, the shape of the blended substance in the epoxy resin-containing composition. Usually, examples thereof include a method of heating the blending components at 50° C. to 200° C. for 5 seconds to 180 minutes. This heating is preferably a two-stage process including primary heating at 50° C. to 160° C. for 5 seconds to 30 minutes and secondary heating at 90° C. to 280° C., which is 40° C. to 120° C. higher than the primary heating temperature, for 1 minute to 150 minutes, from the viewpoint of reducing curing failure.

When the cured product of the present invention is produced as a semi-cured product, the curing reaction of the epoxy resin-containing composition may be advanced to such an extent that the shape can be maintained by heating or the like. When the epoxy resin-containing composition contains a solvent, although most of the solvent is removed by techniques such as heating, reduced pressure, and air drying, 5 wt % or less of the solvent may remain in the semi-cured product.

The presence of the epoxy resin of the present invention in the cured product of the present invention can be confirmed by, for example, identifying the epoxy resin of the present invention from the cured product of the present invention by infrared spectroscopy.

[Application]

The epoxy resin of the present invention is excellent in flexibility. Therefore, the epoxy resin and the epoxy resin-containing composition of the present invention blended with the epoxy resin can be used suitably in the fields of paint, electrical/electronic material, an adhesive, a FRP (fiber reinforced resin), etc. Particularly, the epoxy resin and the epoxy resin-containing composition of the present invention can be suitably used for paint.

EXAMPLES

Hereinafter, although the present invention is described more concretely based on Examples, the present invention is not limited at all by the following Examples. The values of various production conditions and evaluation results in the following Examples have meanings as preferred values of the upper limit or the lower limit in the embodiment of the present invention. A preferred range may be a range defined by a combination of the above upper limit or lower limit and the values of following Examples or a combination of values of Examples.

[Raw Materials]

The raw materials, catalysts, crosslinking agents, medium and solvents used in the following Examples and comparative Examples are as follows.

[Epoxy Compound (A)]

A-1: Hydrogenated bisphenol A liquid epoxy resin (YX8000 manufactured by Mitsubishi Chemical Corporation, epoxy equivalent: 198 g/equivalent)

A-2: 1,6-hexanediol diglycidyl ether (epoxy equivalent: 116 g/equivalent)

A-3: Bisphenol A liquid epoxy resin (jER (registered trademark) 828US manufactured by Mitsubishi Chemical Corporation, epoxy equivalent: 186 g/equivalent)

A-4: Cyclohexanedimethanol diglycidyl ether (Denacol (registered trademark) 216L, manufactured by Nagase ChemteX Corporation, epoxy equivalent: 144 g/equivalent)

A-5: Polytetramethylene glycol diglycidyl ether (epoxy equivalent: 428 g/equivalent)

[Acid-Terminated Polyester (B)]

Acid-terminated polyesters B-1 to B-10 having physical properties shown in Table 1 below were used. The acid-terminated polyester B-1 is U-Pica Coat (registered trademark) GV230 (manufactured by Japan U-PICA Company. Ltd.). The acid-terminated polyesters B-2 to B-10 are obtained by reacting polycarboxylic acids with polyhydric alcohols shown in Table-1.

A method of producing the acid-terminated polyesters B-2 to B-10 and methods of measuring an acid value, a hydroxyl value, a glass transition temperature, a weight average molecular weight and a number average molecular weight of each acid-terminated polyester are as follows.

<Production of Acid-Terminated Polyesters B-2 to B-10>

Into a reaction vessel equipped with a distillation column, 1000 ppm of tetrabutoxy titanium based on the total weight of the polycarboxylic acid component and the polyhydric alcohol component shown in Table 1 was charged. Next, heating was started under stirring, and a reaction system was heated to a temperature of 265° C., and this temperature was maintained. After the esterification reaction was completed and no more water was distilled from the reaction system, the temperature in the reaction system was maintained at 265° C., the pressure in the reaction system was reduced, and a condensation reaction was performed with distilling the polyhydric alcohol component from the reaction system.

The stirring was stopped when the viscosity of the reaction system increases with the reaction and the stirring blade torque showed a predetermined torque. The reaction system was returned to normal pressure, and the reaction product was taken out by pressurizing with nitrogen, so as to obtain the acid-terminated polyesters B-2 to B-10.

<Measurement of Acid Value>

The acid value of the acid-terminated polyester was measured as follows.

About 0.2 g of an acid-terminated polyester was precisely weighed in an Erlenmeyer flask with branches (A(g)), 10 mL of benzyl alcohol was added, and the acid-terminated polyester was dissolved by heating for 15 minutes with a heater at 230° C. under a nitrogen atmosphere. After allowing to be cooled to room temperature, 10 mL of benzyl alcohol, 20 mL of chloroform and several drops of a phenolphthalein solution were added, and the mixture was titrated with a 0.02N KOH solution (titration amount=B (mL), titer of KOH solution=p). Blank measurement was performed in the same manner (titration amount=C (mL)), and the acid value was calculated according to the following formula.

$$\text{Acid value(mgKOH/g)} = \{(B-C) \times 0.02 \times 56.11 \times p\}/A$$

<Measurement of Hydroxyl Value>

A hydroxyl value of the acid-terminated polyester was measured as follows.

Solution 1: About 5 g of an acid-terminated polyester was precisely weighed in an Erlenmeyer flask with branches (A(g)), and 50 mL of THF (tetrahydrofuran) was added to dissolve the acid-terminated polyester, so as to obtain Solution 1.

Solution 2: 30 mL of a dimethylaminopyridine THF solution obtained by dissolving 5 g of N,N-dimethylaminopyridine into 500 mL of THF was added to the "Solution 1", so as to obtain Solution 2.

A THF solution of acetic anhydride in which 200 mL of THF was added to 22 mL of acetic anhydride was prepared, 10 mL of the solution was added to the "Solution 2", and the mixture obtained by mixing the above for 20 minutes was obtained as "Solution 3". To the "Solution 3", 3 mL of ion-exchanged water was added and mixed for 20 minutes, so as to obtain "Solution 4". To the "Solution 4", 50 mL of THF was added, so as to obtain "Solution 5". To the "Solution 5", 25 mL of a 0.5 N KOH methanol solution and a phenolphthalein indicator were added, so as to obtain "Solution 6".

The "Solution 6" was titrated with a 0.5 N KOH methanol solution, and the amount of addition at the point where the solution was colored in a slightly purple color was measured (B (mL)). The titration amount (C (mL)) required during the blank measurement was also confirmed, and the hydroxyl value was calculated according to the following formula using the acid value determined above and the titer p of the 0.5 N KOH methanol solution.

$$\text{Hydroxyl value(mgKOH/g)} = [\text{acid value}] + \{(C-B) \times 0.5 \times 56.11 \times p\}/A$$

<Measurement of Weight Average Molecular Weight and Number Average Molecular Weight>

A weight average molecular weight and a number average molecular weight of the acid-terminated polyester were measured by gel permeation chromatography (GPC). A device and measurement conditions used for GPC measurement are as follows.

Device: GPC
Machine type: HLC-8020GPC (manufactured by Tosoh Corporation)
Column: TSKgel GMHXL (column size: 7.8 mm (ID)× 30.0 cm (L)), three connected in series (manufactured by Tosoh Corporation)
Detector: RI (manufactured by Tosoh Corporation)
Eluent: THF (1 mL/min, 40° C.)
Sample: 0.04% tetrahydrofuran solution (100 μl injection)
Calibration curve: Standard polystyrene (manufactured by Tosoh Corporation)

<Measurement of Tg (Glass Transition Temperature)>

A glass transition temperature of the acid-terminated polyester was determined using a differential scanning calorimeter DSC-60 manufactured by Shimadzu Corporation. The temperature at the intersection of the base line on the low temperature side of the chart and the tangent to the endothermic curve in the vicinity of the glass transition temperature when measured at a heating rate of 5° C./min was defined as the glass transition temperature of the acid-terminated polyester.

TABLE 1

|  |  |  | | B-1 | B-2 | B-3 | B-4 | B-5 |
|---|---|---|---|---|---|---|---|---|
| Charged molar ratio | Polycarboxylic acid | Terephthalic acid | mol/mol | | 40 | 40 | 40 | 40 |
| | | Isophthalic acid | mol/mol | | 60 | 60 | 60 | 60 |
| | Polyhydric alcohol | Ethylene glycol | mol/mol | | 54 | 54 | 57 | 57 |
| | | Neopentyl glycol | mol/mol | | 36 | 36 | | |
| | | 1,3-propanediol | mol/mol | | | | | |
| | | 1,2-propanediol | mol/mol | | | | | |
| | | 1,6-hexanediol | mol/mol | | | | | |
| | | Cyclohexanedimethanol | mol/mol | | | | 38 | 38 |
| | Acid value | | mgKOH/g | 55.1 | 61.4 | 68.7 | 58.9 | 31.8 |
| | Hydroxyl value | | mgKOH/g | 0.1 | 3.9 | 10.8 | 5.0 | 0.1 |
| | Molecular weight | | Mn | 1900 | 1000 | 1000 | 1100 | 2000 |
| | | | Mw | 8400 | 2500 | 2200 | 3000 | 6300 |
| | | | Mw/Mn | 4.4 | 2.5 | 2.2 | 2.7 | 3.2 |
| | Tg | | °C. | 63 | 56 | 54 | 58 | 63 |

|  |  |  | | B-6 | B-7 | B-8 | B-9 | B-10 |
|---|---|---|---|---|---|---|---|---|
| Charged molar ratio | Polycarboxylic acid | Terephthalic acid | mol/mol | 40 | 60 | 40 | 40 | 40 |
| | | Isophthalic acid | mol/mol | 60 | 40 | 60 | 60 | 60 |
| | Polyhydric alcohol | Ethylene glycol | mol/mol | 72 | | | | 13 |
| | | Neopentyl glycol | mol/mol | | | | | |
| | | 1,3-propanediol | mol/mol | | 54 | | | |
| | | 1,2-propanediol | mol/mol | | | 33 | | |
| | | 1,6-hexanediol | mol/mol | | | | 33 | |
| | | Cyclohexanedimethanol | mol/mol | 18 | 36 | 57 | 62 | 77 |
| | Acid value | | mgKOH/g | 60.4 | 62.2 | 70.1 | 32.9 | 49.6 |
| | Hydroxyl value | | mgKOH/g | 1.8 | 3.1 | 0.9 | 4.7 | 3.9 |
| | Molecular weight | | Mn | 1100 | 1300 | 1000 | 2800 | 1400 |
| | | | Mw | 2800 | 3600 | 2600 | 7200 | 4100 |
| | | | Mw/Mn | 2.5 | 2.9 | 2.6 | 2.6 | 2.9 |
| | Tg | | °C. | 56 | 47 | 63 | 42 | 65 |

[Polycarboxylic Acid (C)]
  C-1: Dimer acid (Tsunodyme (registered trademark) 395 manufactured by TSUNO CO., LTD., acid value: 195.6 mgKOH/g)
  C-2: Hydrogenated dimer acid (Pripol (registered trademark) 1009-LQ manufactured by Croda, acid value: 195 mgKOH/g)
  C-3: 1,4-cyclohexanedicarboxylic acid (RIKACID (registered trademark) CI-IDA manufactured by New Japan Chemical Co., ltd.)
[Phenol-Based Compound (D)]
  D-1: Bisphenol A (manufactured by Mitsubishi Chemical Co., hydroxyl equivalent: 114 g/equivalent)
[Catalyst (E)]
  E-1: Tri-o-tolylphosphine
  E-2: 50 wt % aqueous solution of tetramethylammonium chloride
  E-3: N,N-dimethylbenzylamine
[Crosslinking Agent]
  MDI: 4,4'-diphenylmethane diisocyanate (manufactured by Tokyo Chemical Industry Co., Ltd.)
[Evaluation Methods]
  Evaluation methods in the following Examples and Comparative Examples are as follows.
[Epoxy Equivalent]
  Epoxy equivalents of the epoxy resins obtained in Examples 1 to 24 and Comparative Example 1 were measured based on JISK 7236.
[Weight Average Molecular Weight (Mw)]
  The epoxy resins obtained in Examples 1 to 24 and Comparative Example 1 were measured for a weight average molecular weight and a number average molecular weight by gel permeation chromatography (GPC). A device and measurement conditions used for GPC measurement are as follows.

Device: GPC
Machine Type: HLC-8120GPC (manufactured by Tosoh Corporation)
Column: TSKGEL HM-H+H4000+H4000+H3000+H2000 (manufactured by Tosoh Corporation)
Detector: UV-8020 (manufactured by Tosoh Corporation), 254 nm
Eluent: THF (0.5 mL/min, 40° C.)
Sample: 1% tetrahydrofuran solution (10 μl injection)
Calibration Curve: Standard polystyrene (manufactured by Tosoh Corporation)

[Glass Transition Temperature (Tg)]
  The epoxy resins obtained in Examples 1 to 24 and Comparative Example 1 were measured for a glass transition temperature (Tg) by increasing the temperature from −20° C. to 120° C. at 10° C./min using a differential scanning calorimeter "DSC7020" manufactured by SII Nano Technology Inc.

[Flexibility]
(Cupping Resistance)
  In 150 parts by weight of cyclohexanone, 100 parts by weight of each of the epoxy resins obtained in Examples 1 to 24 and Comparative Example 1 was dissolved, and 1 part by weight of 1-isobutyl-2-methylimidazole (jER Cure (registered trademark) IBMI12 manufactured by Mitsubishi Chemical Corporation) was mixed thereto. A 150 μm film applicator was used to apply the obtained mixture to each of the following steel plates and aluminum plates described in JIS K5600-1-4, and the applied plate was heated at 150° C. for 90 minutes to prepare a coating film. The obtained coating film was measured for cupping resistance using the following Erichsen testing machine based on JIS K5600-5-2, and evaluated according to the following criteria, and the result was used as an index of flexibility.

Steel plate: SPCC-SD PB-N144 treated 0.8×70×150 mm
Aluminum plate: A1050P 0.8×70×150 mm
Testing machine: Erichsen testing machine, manufactured by TAIYUKIZAI Co., Ltd.
<Evaluation Criteria>
  ○: No coating film abnormality (cracking, peeling) at a cup indentation depth of 10 mm
  Δ: Coating film abnormality (cracking, peeling) at a cup indentation depth of 10 mm, and no coating film abnormality (cracking, peeling) at a cup indentation depth of 5 mm
  x: Coating film abnormality (cracking, peeling) at a cup indentation depth of 5 mm

[Flex Resistance]

In 150 parts by weight of cyclohexanone, 100 parts by weight of each of the epoxy resins obtained in Examples 1 to 24 and Comparative Example 1 was dissolved, and 1 part by weight of 1-isobutyl-2-methylimidazole (jER Cure (registered trademark) IBMI12 manufactured by Mitsubishi Chemical Corporation) was mixed thereto. A 100 μm film applicator was used to apply the obtained mixture to each of the following steel plates and aluminum plates described in JIS K5600-1-4, and the applied plate was heated at 150° C. for 90 minutes to prepare a coating film. The obtained coating film was subjected to a mandrel test having a diameter of 2 mm using the following bending testing machine based on JIS K5600-5-1, a bending resistance was evaluated according to the following criteria, and a result was used as an index of flexibility.
  Steel plate: SPCC-SB PB-N144 treated 0.3×50×200 mm
  Aluminum plate: A1050P 0.3×50×200 mm
  Testing machine: bending testing machine (Type I), manufactured by TAIYUKIZAI Co., Ltd.
<Evaluation Criteria>
  ○: No abnormal coating film in mandrel test
  x: Abnormal coating film in mandrel test

[Solvent Solubility]

In 150 parts by weight of cyclohexanone, 100 parts by weight of each of the epoxy resins obtained in Examples 1 to 24 and Comparative Example 1 was dissolved, and the appearance was visually observed and evaluated according to the following criteria.
<Evaluation Criteria>
  ○: No solid content precipitated
  x: Solid content precipitated

[Synthesis and Evaluation of Epoxy Resin]

Example 1

To a 0.5 L flask, 50 parts by weight of hydrogenated bisphenol A liquid epoxy resin (YX8000 manufactured by Mitsubishi Chemical Corporation, epoxy equivalent: 198 g/equivalent) (A-1), 154 parts by weight of U-Pica Coat (registered trademark) GV230 (manufactured by Japan U-PICA Company. Ltd.) (B-1), and 0.15 part by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 2

To a 0.5 L flask, 60 parts by weight of hydrogenated bisphenol A liquid epoxy resin (YX8000 manufactured by Mitsubishi Chemical Corporation, epoxy equivalent: 198 g/equivalent) (A-1), 159 parts by weight of an acid-terminated polyester (B-2), and 0.03 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 3

To a 0.5 L flask, 64 parts by weight of hydrogenated bisphenol A liquid epoxy resin (YX8000 manufactured by Mitsubishi Chemical Corporation, epoxy equivalent: 198 g/equivalent) (A-1), 155 parts by weight of an acid-terminated polyester (B-2), and 0.06 parts by weight of 50 wt % aqueous solution of tetramethylammonium chloride (E-2) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 4

To a 3 L flask, 360 parts by weight of hydrogenated bisphenol A liquid epoxy resin (YX8000 manufactured by Mitsubishi Chemical Corporation, epoxy equivalent: 198 g/equivalent) (A-1), 1000 parts by weight of the acid-terminated polyester (B-2), and 0.36 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 5

To a 0.5 L flask, 62 parts by weight of hydrogenated bisphenol A liquid epoxy resin (YX8000 manufactured by Mitsubishi Chemical Corporation, epoxy equivalent: 198 g/equivalent) (A-1), 172 parts by weight of an acid-terminated polyester (B-2), and 0.06 parts by weight of tri-p-tolylphosphine (E-1) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 6

To a 0.5 L flask, 62 parts by weight of hydrogenated bisphenol A liquid epoxy resin (YX8000 manufactured by Mitsubishi Chemical Corporation, epoxy equivalent: 198 g/equivalent) (A-1), 171 parts by weight of an acid-terminated polyester (B-3), and 0.09 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 7

To a 0.5 L flask, 42 parts by weight of hydrogenated bisphenol A liquid epoxy resin (YX8000 manufactured by Mitsubishi Chemical Corporation, epoxy equivalent: 198 g/equivalent) (A-1), 202 parts by weight of an acid-terminated polyester (B-5), and 0.04 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-2.

Example 8

To a 3 L flask, 230 parts by weight of 1,6-hexanediol diglycidyl ether (epoxy equivalent: 116 g/equivalent) (A-2), 1166 parts by weight of the acid-terminated polyester (B-2), and 0.23 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 9

To a 0.5 L flask, 35 parts by weight of 1,6-hexanediol diglycidyl ether (epoxy equivalent: 116 g/equivalent) (A-2), 189 parts by weight of the acid-terminated polyester (B-2), and 0.04 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 10

To a 0.5 L flask, 62 parts by weight of bisphenol A liquid epoxy resin (jER (registered trademark) 828US manufactured by Mitsubishi Chemical Corporation, epoxy equivalent: 186 g/equivalent) (A-3), 202 parts by weight of the acid-terminated polyester (B-2), and 0.06 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 11

To a 0.5 L flask, 46 parts by weight of cyclohexanedimethanol diglycidyl ether (Denacol (registered trademark) 216L, manufactured by Nagase ChemteX Corporation, epoxy equivalent: 144 g/equivalent) (A-4), 185 parts by weight of the acid-terminated polyester (B-2), and 0.05 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 12

To a 0.5 L flask, 36 parts by weight of 1,6-hexanediol diglycidyl ether (epoxy equivalent: 116 g/equivalent) (A-2), 185 parts by weight of an acid-terminated polyester (B-6), and 0.04 part by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 13

To a 0.5 L flask, 34 parts by weight of 1,6-hexanediol diglycidyl ether (epoxy equivalent: 116 g/equivalent) (A-2), 195 parts by weight of an acid-terminated polyester (B-7), and 0.03 part by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 14

To a 0.5 L flask, 38 parts by weight of 1,6-hexanediol diglycidyl ether (epoxy equivalent: 116 g/equivalent) (A-2), 189 parts by weight of an acid-terminated polyester (B-8), and 0.04 part by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 15

To a 0.5 L flask, 22 parts by weight of 1,6-hexanediol diglycidyl ether (epoxy equivalent: 116 g/equivalent) (A-2), 198 parts by weight of an acid-terminated polyester (B-9), and 0.02 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 16

To a 0.5 L flask, 70 parts by weight of 1,6-hexanediol diglycidyl ether (epoxy equivalent: 116 g/equivalent) (A-2), 427 parts by weight of an acid-terminated polyester (B-10), and 0.07 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-3.

Example 17

To a 0.5 L flask, 40 parts by weight of 1,6-hexanediol diglycidyl ether (epoxy equivalent: 116 g/equivalent) (A-2), 171 parts by weight of the acid-terminated polyester (B-2), 11 parts by weight of dimer acid (Tsunodyme (registered trademark) 395 manufactured by TSUNO CO., LTD., acid value: 195.6 mgKOH/g) (C-1), and 0.04 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 18

To a 0.5 L flask, 40 parts by weight of 1,6-hexanediol diglycidyl ether (epoxy equivalent: 116 g/equivalent) (A-2), 187 parts by weight of the acid-terminated polyester (B-2), 12 parts by weight of hydrogenated dimer acid (Pripol (registered trademark) 1009-LQ manufactured by Croda, acid value: 195 mgKOH/g) (C-2), and 0.04 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 19

To a 2 L flask, 120 parts by weight of 1,6-hexanediol diglycidyl ether (epoxy equivalent: 116 g/equivalent) (A-2), 659 parts by weight of the acid-terminated polyester (B-4), 41 parts by weight of dimer acid (Tsunodyme (registered trademark) 395 manufactured by TSUNO CO., LTD., acid value: 195.6 mgKOH/g) (C-1), and 0.12 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 20

To a 0.5 L flask, 30 parts by weight of 1,6-hexanediol diglycidyl ether (epoxy equivalent: 116 g/equivalent) (A-2), 187 parts by weight of the acid-terminated polyester (B-5), 11 parts by weight of dimer acid (Tsunodyme (registered trademark) 395 manufactured by TSUNO CO., LTD., acid value: 195.6 mgKOH/g) (C-1), and 0.03 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 21

To a 0.5 L flask, 58 parts by weight of hydrogenated bisphenol A liquid epoxy resin (YX8000 manufactured by Mitsubishi Chemical Corporation, epoxy equivalent: 198 g/equivalent) (A-1), 157 parts by weight of the acid-terminated polyester (B-4), 11 parts by weight of dimer acid (Tsunodyme (registered trademark) 395 manufactured by TSUNO CO., LTD., acid value: 195.6 mgKOH/g) (C-1), and 0.06 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 22

To a 1 L flask, 120 parts by weight of hydrogenated bisphenol A liquid epoxy resin (YX8000 manufactured by Mitsubishi Chemical Corporation, epoxy equivalent: 198 g/equivalent) (A-1), 362 parts by weight of the acid-terminated polyester (B-4), 10 parts by weight of dimer acid (Tsunodyme (registered trademark) 395 manufactured by TSUNO CO., LTD., acid value: 195.6 mgKOH/g) (C-1), and 0.12 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 23

To a 1 L flask, 68 parts by weight of hydrogenated bisphenol A liquid epoxy resin (YX8000 manufactured by Mitsubishi Chemical Corporation, epoxy equivalent: 198 g/equivalent) (A-1), 161 parts by weight of the acid-terminated polyester (B-4), 7 parts by weight of 1,4-cyclohexanedicarboxylic acid (RIKACID (registered trademark) CHDA manufactured by New Japan Chemical co., ltd.) (C-3), and 0.07 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Example 24

To a 1 L flask, 60 parts by weight of bisphenol A liquid epoxy resin (jER (registered trademark) 828US manufactured by Mitsubishi Chemical Corporation, epoxy equivalent: 186 g/equivalent) (A-3), 159 parts by weight of the acid-terminated polyester (B-4), 12 parts by weight of dimer acid (Tsunodyme (registered trademark) 395 manufactured by TSUNO CO., LTD., acid value: 195.6 mgKOH/g) (C-1), and 0.06 parts by weight of N,N-dimethylbenzylamine (E-3) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Comparative Example 1

To a 1 L flask, 173 parts by weight of bisphenol A liquid epoxy resin (jER (registered trademark) 828US manufactured by Mitsubishi Chemical Corporation, epoxy equivalent: 186 g/equivalent) (A-3), 100 parts by weight of polytetramethylene glycol diglycidyl ether (epoxy equivalent: 428 g/equivalent) (A-5), 112 parts by weight of bisphenol A (manufactured by Mitsubishi Chemical Co., hydroxyl equivalent: 114 g/equivalent) (D-1), and 0.54 part by weight of 50 wt % aqueous solution of tetramethylammonium chloride (E-2) were charged, and a polymerization reaction was performed at 150° C. for 6 hours under a nitrogen gas atmosphere to obtain a target epoxy resin. The obtained epoxy resin was evaluated for the epoxy equivalent, the weight average molecular weight (Mw), the number average molecular weight (Mn), the molecular weight distribution (Mw/Mn), the Tg, the flexibility (cupping resistance and flex resistance), and the solvent solubility by using the above methods, and the results were shown in Table-4.

Comparative Example 2

To a 0.5 L flask, 32 parts by weight of 1,6-hexanediol diglycidyl ether (epoxy equivalent: 116 g/equivalent) (A-2), 199 parts by weight of U-Pica Coat (registered trademark) GV230 (manufactured by Japan U-PICA Company. Ltd.) (B-1), 0.03 parts by weight of N,N-dimethylbenzylamine (E-3), and 0.34 parts by weight of a crosslinking agent (MDI) were charged. When a polymerization reaction was performed at 150° C. for 5 hours under a nitrogen gas atmosphere, gelation proceeded.

The amount of MDI used was such that the equivalent of the isocyanate group was 0.01 equivalent relative to the epoxy group of the epoxy compound (A-2).

TABLE 2

| | | | Example 1 | Example 2 | Example 3 | Example 4 | Example 5 | Example 6 | Example 7 |
|---|---|---|---|---|---|---|---|---|---|
| Proportion used (parts by weight) | Epoxy compound (A) | A-1 | 50 | 60 | 64 | 360 | 62 | 62 | 42 |
| | | A-2 | | | | | | | |
| | | A-3 | | | | | | | |
| | | A-4 | | | | | | | |
| | | A-5 | | | | | | | |
| | Acid-terminated polyester (B) | B-1 | 154 | | | | | | |
| | | B-2 | | 159 | 155 | 1000 | 172 | | |
| | | B-3 | | | | | | 171 | |
| | | B-4 | | | | | | | |
| | | B-5 | | | | | | | 202 |
| | | B-6 | | | | | | | |
| | | B-7 | | | | | | | |
| | | B-8 | | | | | | | |
| | | B-9 | | | | | | | |
| | | B-10 | | | | | | | |

TABLE 2-continued

|  |  |  | Example 1 | Example 2 | Example 3 | Example 4 | Example 5 | Example 6 | Example 7 |
|---|---|---|---|---|---|---|---|---|---|
|  | Polycarboxylic acid (C) | C1 |  |  |  |  |  |  |  |
|  |  | C-2 |  |  |  |  |  |  |  |
|  |  | C-3 |  |  |  |  |  |  |  |
|  | Phenol-based compound (D) | D-1 |  |  |  |  |  |  |  |
|  | Catalyst (E) | E-1 |  |  |  |  |  | 0.06 |  |
|  |  | E-2 |  |  |  | 0.06 |  |  |  |
|  |  | E-3 | 0.15 | 0.03 |  | 0.36 |  | 0.09 | 0.04 |
|  | Crosslinking agent | MDI |  |  |  |  |  |  |  |
| Analytical values of epoxy resin | Epoxy equivalent | g/equivalent | 2183 | 2699 | 2077 | 2785 | 2697 | 3393 | 2851 |
|  | Molecular weight | Mn | 2064 | 4570 | 3000 | 4075 | 4401 | 4018 | 4289 |
|  |  | Mw | 32534 | 48403 | 16919 | 20085 | 30665 | 16863 | 19882 |
|  |  | Mw/Mn | 15.8 | 10.6 | 5.3 | 4.9 | 7.0 | 4.2 | 4.6 |
|  | Tg | °C. | 57 | 57 | 53 | 55 | 56 | 54 | 57 |
| Evaluation result on flexibility | Cupping resistance (steel plate) |  | ○ | ○ | ○ | ○ | ○ | ○ | ○ |
|  | Flex resistance (steel plate) |  | x | ○ | ○ | ○ | ○ | ○ | ○ |
|  | Cupping resistance (aluminum plate) |  | x | Δ | Δ | Δ | Δ | Δ | ○ |
|  | Flex resistance (aluminum plate) |  | x | x | x | x | x | x | ○ |
|  | Solvent solubility |  | ○ | ○ | ○ | ○ | ○ | ○ | ○ |

TABLE 3

|  |  |  | Example 8 | Example 9 | Example 10 | Example 11 | Example 12 | Example 13 | Example 14 | Example 15 | Example 16 |
|---|---|---|---|---|---|---|---|---|---|---|---|
| Proportion used (parts by weight) | Epoxy compound (A) | A-1 |  |  |  |  |  |  |  |  |  |
|  |  | A-2 | 230 | 35 |  |  | 36 | 34 | 38 | 22 | 70 |
|  |  | A-3 |  |  | 62 |  |  |  |  |  |  |
|  |  | A-4 |  |  |  | 46 |  |  |  |  |  |
|  |  | A-5 |  |  |  |  |  |  |  |  |  |
|  | Acid-terminated polyester (B) | B-1 |  |  |  |  |  |  |  |  |  |
|  |  | B-2 | 1166 | 189 | 202 | 185 |  |  |  |  |  |
|  |  | B-3 |  |  |  |  |  |  |  |  |  |
|  |  | B-4 |  |  |  |  |  |  |  |  |  |
|  |  | B-5 |  |  |  |  |  |  |  |  |  |
|  |  | B-6 |  |  |  |  | 185 |  |  |  |  |
|  |  | B-7 |  |  |  |  |  | 195 |  |  |  |
|  |  | B-8 |  |  |  |  |  |  | 189 |  |  |
|  |  | B-9 |  |  |  |  |  |  |  | 198 |  |
|  |  | B-10 |  |  |  |  |  |  |  |  | 427 |
|  | Polycarboxylic acid (C) | C1 |  |  |  |  |  |  |  |  |  |
|  |  | C-2 |  |  |  |  |  |  |  |  |  |
|  |  | C-3 |  |  |  |  |  |  |  |  |  |
|  | Phenol-based compound (D) | D-1 |  |  |  |  |  |  |  |  |  |
|  | Catalyst (E) | E-1 |  |  |  |  |  |  |  |  |  |
|  |  | E-2 |  |  |  |  |  |  |  |  |  |
|  |  | E-3 | 0.23 | 0.04 | 0.06 | 0.05 | 0.04 | 0.03 | 0.04 | 0.02 | 0.07 |
|  | Crosslinking agent | MDI |  |  |  |  |  |  |  |  |  |
| Analytical values of epoxy resin | Epoxy equivalent | g/equivalent | 3288 | 4093 | 2979 | 3564 | 2859 | 3400 | 3415 | 4410 | 2890 |
|  | Molecular weight | Mn | 5452 | 6254 | 4005 | 4514 | 4415 | 5585 | 5655 | 6539 | 6004 |
|  |  | Mw | 27511 | 42891 | 18768 | 25807 | 24065 | 19191 | 23367 | 21074 | 21661 |
|  |  | Mw/Mn | 5.0 | 6.9 | 4.7 | 5.7 | 5.5 | 3.4 | 4.1 | 3.2 | 3.6 |
|  | Tg | °C. | 31 | 33 | 65 | 37 | 41 | 35 | 47 | 33 | 48 |
| Evaluation result on flexibility | Cupping resistance (steel plate) |  | ○ | ○ | ○ | ○ | ○ | ○ | ○ | ○ | ○ |
|  | Flex resistance (steel plate) |  | ○ | ○ | ○ | ○ | ○ | ○ | ○ | ○ | ○ |
|  | Cupping resistance (aluminum plate) |  | Δ | Δ | Δ | Δ | ○ | ○ | ○ | ○ | ○ |
|  | Flex resistance (aluminum plate) |  | x | x | x | x | x | ○ | ○ | ○ | ○ |
|  | Solvent solubility |  | ○ | ○ | ○ | ○ | ○ | ○ | ○ | ○ | x |

TABLE 4

|  |  |  | Example 17 | Example 18 | Example 19 | Example 20 | Example 21 | Example 22 |
|---|---|---|---|---|---|---|---|---|
| Proportion used (part by weight) | Epoxy compound (A) | A-1 |  |  |  |  | 58 | 120 |
|  |  | A-2 | 40 | 40 | 120 | 30 |  |  |
|  |  | A-3 |  |  |  |  |  |  |
|  |  | A-4 |  |  |  |  |  |  |
|  |  | A-5 |  |  |  |  |  |  |
|  | Acid-terminated polyester (B) | B-1 |  |  |  |  |  |  |
|  |  | B-2 | 171 | 187 |  |  |  |  |
|  |  | B-3 |  |  |  |  |  |  |
|  |  | B-4 |  |  | 659 |  | 157 | 362 |
|  |  | B-5 |  |  |  | 187 |  |  |
|  |  | B-6 |  |  |  |  |  |  |
|  |  | B-7 |  |  |  |  |  |  |
|  |  | B-8 |  |  |  |  |  |  |
|  |  | B-9 |  |  |  |  |  |  |
|  |  | B-10 |  |  |  |  |  |  |
|  | Polycarboxylic acid (C) | C1 | 11 |  | 41 | 11 | 11 | 10 |
|  |  | C-2 |  | 12 |  |  |  |  |
|  |  | C-3 |  |  |  |  |  |  |
|  | Phenol-based compound (D) | D-1 |  |  |  |  |  |  |
|  | Catalyst (E) | E-1 |  |  |  |  |  |  |
|  |  | E-2 |  |  |  |  |  |  |
|  |  | E-3 | 0.04 | 0.04 | 0.12 | 0.03 | 0.06 | 0.12 |
|  | Crosslinking agent | MDI |  |  |  |  |  |  |
| Analytical values of epoxy resin | Epoxy equivalent | g/equivalent | 2565 | 3181 | 6224 | 2105 | 3992 | 3743 |
|  | Molecular weight | Mn | 4698 | 4888 | 5417 | 5102 | 3992 | 5296 |
|  |  | Mw | 19115 | 23259 | 47148 | 19823 | 23956 | 29524 |
|  |  | Mw/Mn | 4.1 | 4.8 | 8.7 | 3.9 | 5.0 | 5.6 |
|  | Tg | °C. | 21 | 22 | 31 | 28 | 50 | 57 |
| Evaluation result on flexibility | Cupping resistance (steel plate) |  | ○ | ○ | ○ | ○ | ○ | ○ |
|  | Flex resistance (steel plate) |  | ○ | ○ | ○ | ○ | ○ | ○ |
|  | Cupping resistance (aluminum plate) |  | ○ | ○ | ○ | ○ | ○ | ○ |
|  | Flex resistance (aluminum plate) |  | x | x | ○ | ○ | ○ | ○ |
|  | Solvent solubility |  | ○ | ○ | ○ | ○ | ○ | ○ |

|  |  |  | Example 23 | Example 24 | Comparative Example 1 | Comparative Example 2 |
|---|---|---|---|---|---|---|
| Proportion used (part by weight) | Epoxy compound (A) | A-1 | 68 |  |  |  |
|  |  | A-2 |  |  |  | 32 |
|  |  | A-3 |  | 60 | 173 |  |
|  |  | A-4 |  |  |  |  |
|  |  | A-5 |  |  | 100 |  |
|  | Acid-terminated polyester (B) | B-1 |  |  |  | 199 |
|  |  | B-2 |  |  |  |  |
|  |  | B-3 |  |  |  |  |
|  |  | B-4 | 161 | 159 |  |  |
|  |  | B-5 |  |  |  |  |
|  |  | B-6 |  |  |  |  |
|  |  | B-7 |  |  |  |  |
|  |  | B-8 |  |  |  |  |
|  |  | B-9 |  |  |  |  |
|  |  | B-10 |  |  |  |  |
|  | Polycarboxylic acid (C) | C1 |  | 12 |  |  |
|  |  | C-2 |  |  |  |  |
|  |  | C-3 | 7 |  |  |  |
|  | Phenol-based compound (D) | D-1 |  |  | 112 |  |
|  | Catalyst (E) | E-1 |  |  |  |  |
|  |  | E-2 |  |  | 0.54 |  |
|  |  | E-3 | 0.07 | 0.06 |  | 0.03 |
|  | Crosslinking agent | MDI |  |  |  | 0.34 |
| Analytical values of epoxy resin | Epoxy equivalent | g/equivalent | 3180 | 2710 | 3175 | Gelation |
|  | Molecular weight | Mn | 4547 | 4822 | 7548 |  |
|  |  | Mw | 22270 | 25092 | 33674 |  |
|  |  | Mw/Mn | 4.9 | 5.2 | 4.5 |  |
|  | Tg | °C. | 58 | 61 | 53 |  |
| Evaluation result on flexibility | Cupping resistance (steel plate) |  | ○ | ○ | x |  |
|  | Flex resistance (steel plate) |  | ○ | ○ | x |  |
|  | Cupping resistance (aluminum plate) |  | ○ | ○ | x |  |

TABLE 4-continued

| | | | |
|---|---|---|---|
| Flex resistance (aluminum plate) | ○ | ○ | x |
| Solvent solubility | ○ | ○ | ○ |

[Evaluation Result]

As can be seen from Tables 2 to 4, the epoxy resin obtained by the reaction of the epoxy compound (A) and the acid-terminated polyester (B) had good flexibility of the coating film.

On the other hand, the epoxy resin of Comparative Example 1 was insufficient in flexibility. In addition, in Comparative Example 2, it was difficult to control the reaction, and an epoxy resin could not be obtained.

Since the epoxy resin of Example 1 has a wide molecular weight distribution, while it is inferior in flex resistance and cupping resistance on an aluminum plate, it has good cupping resistance and excellent flexibility on a steel plate.

Although the present invention has been described in detail with reference to specific embodiments, it will be apparent to those skilled in the art that various changes and modifications can be made without departing from the spirit and scope of the present invention. This application is based on Japanese patent application (Japanese Patent Application No. 2017-103732) filed on May 25, 2017 and Japanese patent application (Japanese Patent Application No. 2017-215656) filed on Nov. 8, 2017, and the contents of which are incorporated herein by reference.

INDUSTRIAL APPLICABILITY

The epoxy resin of the present invention is excellent in flexibility. Therefore, the epoxy resin, the epoxy resin-containing composition containing the epoxy resin and the cured product thereof according to the present invention can be used suitably in the fields of paint, electrical/electronic material, an adhesive, a FRP (fiber reinforced resin), etc.

The invention claimed is:

1. An epoxy resin, which is a reaction product of an epoxy compound (A) and an acid-terminated polyester (B), wherein the acid-terminated polyester (B) is the reaction product of at least one polycarboxylic acid monomer and at least one polyhydric alcohol monomer comprising a diol having a cyclic structure, wherein
the at least one polycarboxylic acid monomer does not comprise a cyclohexane dicarboxylic acid,
the diol having a cyclic structure comprises at least one of 1,4-cyclohexanedimethanol and isosorbide,
an amount of a diol having a cyclic structure in the polyhydric alcohol monomer is 20 mol % to 70 mol %, and
an Epoxy equivalent of the epoxy resin is from greater than 1500 g/equivalent to 200,000 g/equivalent.

2. The epoxy resin according to claim 1, wherein the epoxy resin has a weight average molecular weight of 7,000 to 300,000 and the epoxy resin has a ratio of the weight average molecular weight/a number average molecular weight of 1.1 to 20.0.

3. The epoxy resin according to claim 1, wherein the acid-terminated polyester (B) has a weight average molecular weight of 500 to 10,000, and the acid-terminated polyester (B) has the weight average molecular weight/a number average molecular weight of 1.1 to 10.0.

4. An epoxy resin-containing composition, comprising the epoxy resin according to claim 1 and a curing agent.

5. The epoxy resin-containing composition according to claim 4, wherein the curing agent is contained in an amount of from 0.1 to 1000 parts by weight based on 100 parts by weight of the epoxy resin.

6. The epoxy resin-containing composition according to claim 4, wherein the curing agent is at least one selected from the group consisting of a polyfunctional phenol, a polyisocyanate compound, an amine compound, an acid anhydride compound, an imidazole compound, an amide compound, a mercaptan compound, a cationic polymerization initiator, an organic phosphine, a phosphonium salt and a tetraphenylboron salt.

7. A cured product obtained by curing the epoxy resin-containing composition according to claim 4.

8. The epoxy resin according to claim 1, wherein the amount of the diol having a cyclic structure in the polyhydric alcohol monomer is 30 mol % to 70 mol %.

9. The epoxy resin according to claim 1, wherein the at least one polycarboxylic acid monomer comprises an aromatic polycarboxylic acid compound.

10. The epoxy resin according to claim 1, wherein the epoxy compound (A) is selected from the group consisting of bisphenol diglycidyl ethers, biphenol diglycidyl ethers, (poly)alkylene glycol diglycidyl ethers, an epoxy compound wherein hydrogen is added to an aromatic ring of bisphenol diglycidyl ethers, and an epoxy compound wherein hydrogen is added to an aromatic ring of biphenol diglycidyl ethers.

11. The epoxy resin according to claim 1, wherein the epoxy compound (A) is selected from the group consisting of (poly)alkylene glycol diglycidyl ethers, an epoxy compound wherein hydrogen is added to an aromatic ring of bisphenol diglycidyl ethers, and an epoxy compound wherein hydrogen is added to an aromatic ring of biphenol diglycidyl ethers.

12. The epoxy resin according to claim 1, wherein the polycarboxylic acid monomer comprises a terephthalic acid and/or an isophthalic acid.

13. The epoxy resin according to claim 1, wherein the polycarboxylic acid monomer comprises a terephthalic acid.

14. An epoxy resin, which is a reaction product of an epoxy compound (A) and an acid-terminated polyester (B), wherein the acid-terminated polyester (B) is the reaction product of at least one polycarboxylic acid monomer and at least one polyhydric alcohol monomer comprising a diol having a cyclic structure, wherein
the at least one polycarboxylic acid monomer does not comprise a cyclohexane dicarboxylic acid,
the diol having a cyclic structure comprises at least one of 1,4-cyclohexanedimethanol and isosorbide,
an amount of a diol having a cyclic structure in the polyhydric alcohol monomer is 30 mol % to 70 mol %,
the epoxy resin has a weight average molecular weight of 7,000 to 300,000 and the epoxy resin has a ratio of the weight average molecular weight/a number average molecular weight of 1.1 to 20.0,
the acid-terminated polyester (B) has a weight average molecular weight of 500 to 10,000, and the acid-terminated polyester (B) has the weight average molecular weight/a number average molecular weight of 1.1 to 10.0,
and
an Epoxy equivalent of the epoxy resin is from greater than 1,500 g/equivalent to 200,000 g/equivalent.

* * * * *